(12) United States Patent
Miyasaka et al.

(10) Patent No.: US 10,850,572 B2
(45) Date of Patent: Dec. 1, 2020

(54) TIRE

(71) Applicant: BRIDGESTONE CORPORATION, Tokyo (JP)

(72) Inventors: Atsushi Miyasaka, Tokyo (JP); Sotaro Iwabuchi, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 264 days.

(21) Appl. No.: 15/573,489

(22) PCT Filed: May 13, 2016

(86) PCT No.: PCT/JP2016/064357
§ 371 (c)(1),
(2) Date: Nov. 13, 2017

(87) PCT Pub. No.: WO2016/182076
PCT Pub. Date: Nov. 17, 2016

(65) Prior Publication Data
US 2018/0141390 A1    May 24, 2018

(30) Foreign Application Priority Data

May 14, 2015   (JP) ................. 2015-099530
May 14, 2015   (JP) ................. 2015-099533
(Continued)

(51) Int. Cl.
*B60C 13/00*   (2006.01)
*B60C 13/02*   (2006.01)
(Continued)

(52) U.S. Cl.
CPC ............ *B60C 13/001* (2013.01); *B29D 30/72* (2013.01); *B60C 11/00* (2013.01); *B29D 2030/726* (2013.01)

(58) Field of Classification Search
CPC .................................................. B60C 13/001
(Continued)

(56) References Cited

U.S. PATENT DOCUMENTS

D204,585 S  *  4/1966  Vizina, Jr. ................... D12/605
6,124,925 A     9/2000  Kaneko et al.
(Continued)

FOREIGN PATENT DOCUMENTS

CN     1286661 A    3/2001
CN    102015332 A   4/2011
(Continued)

OTHER PUBLICATIONS

Machine Translation: FR-3009522-A1;Muhlhoff Olivier; (Year: 2019).*
(Continued)

*Primary Examiner* — Kendra Ly
(74) *Attorney, Agent, or Firm* — Solaris Intellectual Property Group, PLLC

(57) ABSTRACT

A tire including a pattern region and plural unit patterns. The pattern region is formed at an outer surface of a tire and includes a base. The plural unit patterns are formed within the pattern region, and each unit pattern is formed including extension portions having a projection height from the base of from 0.1 mm to 1.0 mm. The extension portions extend in plural directions from a bend point in plan view. A spacing between the bend points of adjacent unit patterns out of the unit patterns is from 0.2 mm to 1.0 mm.

12 Claims, 33 Drawing Sheets

(30) Foreign Application Priority Data

May 14, 2015 (JP) ................................. 2015-099535
May 13, 2016 (JP) ................................. 2016-096776

(51) Int. Cl.
*B60C 11/00* (2006.01)
*B29D 30/72* (2006.01)

(58) Field of Classification Search
USPC ....................................................... D12/605
See application file for complete search history.

(56) References Cited

U.S. PATENT DOCUMENTS

| | | | |
|---|---|---|---|
| 6,253,815 B1 | | 7/2001 | Kemp et al. |
| D731,963 S | * | 6/2015 | Debordeaux ................ D12/605 |
| D735,654 S | * | 8/2015 | Ropars ......................... D12/605 |
| D735,655 S | * | 8/2015 | Frappart ...................... D12/605 |
| D735,656 S | * | 8/2015 | Seii .............................. D12/605 |
| D735,657 S | * | 8/2015 | Frappart ...................... D12/605 |
| D735,658 S | * | 8/2015 | Nomura ....................... D12/605 |
| D735,659 S | * | 8/2015 | Ropars ......................... D12/605 |
| D736,700 S | * | 8/2015 | Frappart ...................... D12/605 |
| D749,498 S | * | 2/2016 | Ropars ......................... D12/605 |
| 2009/0218019 A1 | | 9/2009 | Paturle |
| 2011/0094646 A1 | | 4/2011 | Watanabe |
| 2011/0139326 A1 | | 6/2011 | Nukushina |
| 2012/0227879 A1 | | 9/2012 | Muhlhoff et al. |
| 2012/0273101 A1 | | 11/2012 | Iwabuchi |
| 2014/0166177 A1 | | 6/2014 | Muhlhoff et al. |
| 2014/0216622 A1 | | 8/2014 | Muhlhoff et al. |
| 2015/0246587 A1 | | 9/2015 | Muhlhoff et al. |
| 2015/0314652 A1 | | 11/2015 | Iwabuchi |
| 2015/0314653 A1 | | 11/2015 | Iwabuchi |
| 2015/0321523 A1 | * | 11/2015 | Takahashi ............. B60C 13/002 152/523 |
| 2016/0137008 A1 | | 5/2016 | Emorine et al. |
| 2016/0152095 A1 | | 6/2016 | Berger et al. |
| 2016/0361955 A1 | | 12/2016 | Iwabuchi |

FOREIGN PATENT DOCUMENTS

| | | |
|---|---|---|
| DE | 69828673 T2 | 6/2005 |
| EP | 1075970 A2 | 2/2001 |
| FR | 3009522 A1 * | 2/2015 |
| JP | H10-147114 A | 6/1998 |
| JP | H11-291721 A | 10/1999 |
| JP | H11-291722 A | 10/1999 |
| JP | 2002-522294 A | 7/2002 |
| JP | 2003246209 A * | 9/2003 |
| JP | 2009-512584 A | 3/2009 |
| JP | 2011-121523 A | 6/2011 |
| JP | 2011116306 A * | 6/2011 |
| JP | 2011-148338 A | 8/2011 |
| JP | 2013-505872 A | 2/2013 |
| JP | 2013060181 A * | 4/2013 |
| JP | 2013-147085 A | 8/2013 |
| JP | 2014-136487 A | 7/2014 |
| JP | 2014-522341 A | 9/2014 |
| JP | 2014180946 A * | 9/2014 |
| JP | 2014-205394 A | 10/2014 |
| JP | 2015-168287 A | 9/2015 |
| KR | 100910046 B1 | 7/2009 |
| WO | 2011/062241 A1 | 5/2011 |
| WO | 2012/111773 A1 | 8/2012 |
| WO | 2012/131089 A1 | 10/2012 |
| WO | 2014/040967 A1 | 3/2014 |
| WO | 2014/202729 A1 | 12/2014 |
| WO | 2014/202731 A1 | 12/2014 |
| WO | 2015/018763 A1 | 2/2015 |

OTHER PUBLICATIONS

Machine Translation: JP-2013060181-A;Suzuki, Keita; (Year: 2019).*
Machine Translation: JP-2003246209-A;Iida, Hidekazu; (Year: 2019).*
Machine Translation: JP-2011116306-A; Iwabuchi, Sotaro; (Year: 2020).*
Machine Translation: JP-2014180946-A; Hirosue Eisuke; (Year: 2020).*
International Search Report issued in International Application No. PCT/JP2016/064357 dated Jul. 19, 2016.
Search Report of the Chinese office action dated Jan. 29, 2019, from the SIPO in a Chinese patent application corresponding to the instant patent application.
Extended European Search Report dated May 11, 2018 issued in corresponding EP Patent Application No. 16792800.1.

* cited by examiner

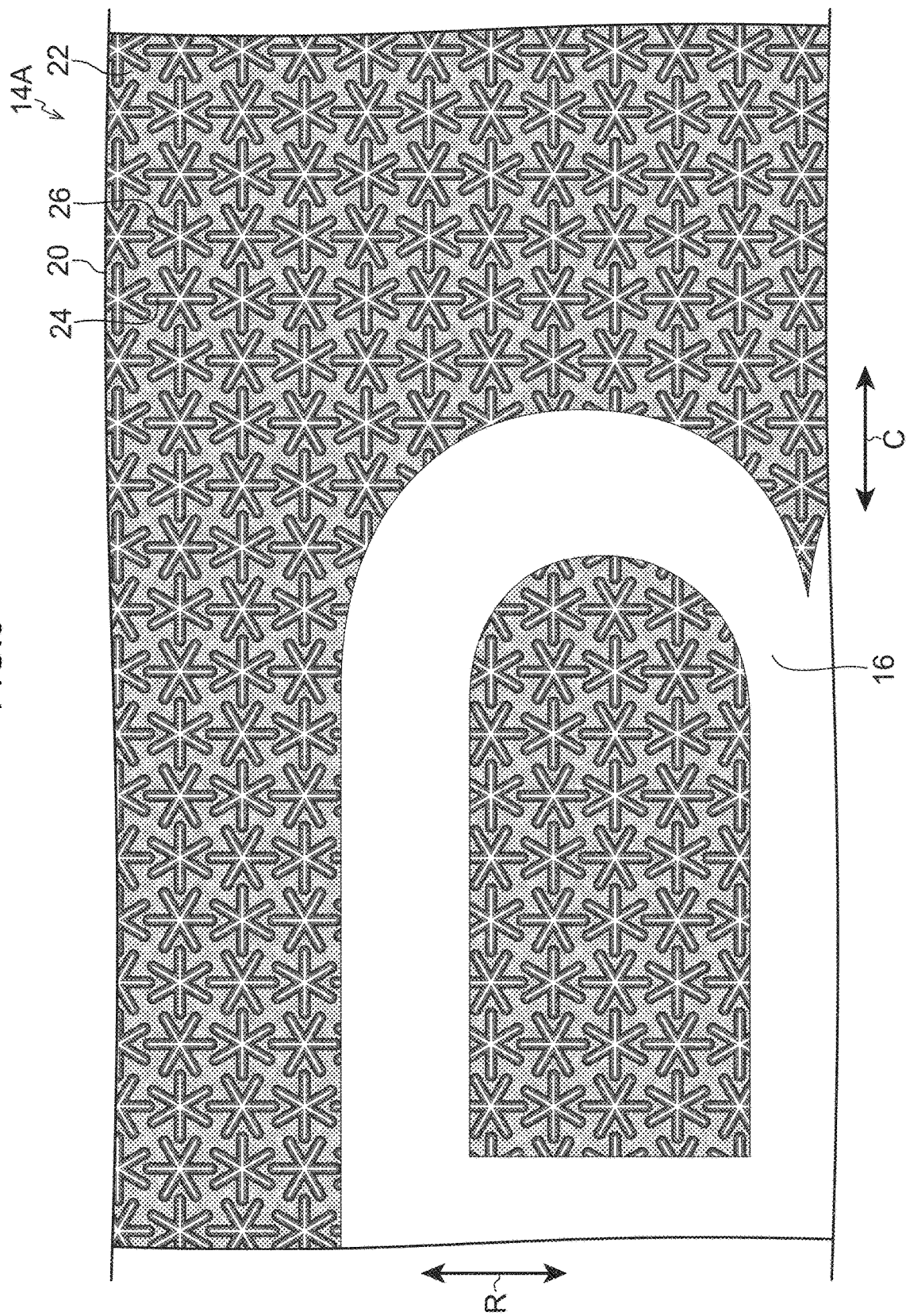

TIRE

TECHNICAL FIELD

The present invention relates to a tire having an outer surface formed with a pattern.

BACKGROUND ART

Traditionally, fine projections are formed at a side portion of a tire in order to form a contrasting pattern. For example, International Publication (WO) No. 2012/131089 describes technology to obtain high contrast markings on a single-color surface by forming plural projections distributed across the entirety of a pattern.

SUMMARY OF INVENTION

Technical Problem

In contrasting patterns such as that described above, light reflection is controlled so as to generate contrast with respect to light-reflecting surroundings. However, in Patent Document 1, the projections are anisotropic, and sometimes the patterned section does not appear uniform when viewed from different angles. More consideration needs to be given to unevenness formed to the pattern in order to control light reflection and enhance visibility.

In consideration of the above circumstances, an object of the present invention is to provide a tire in which visibility is enhanced by raising the uniformity of the appearance of a patterned section in a pattern region on an outer surface of a tire when viewed from different angles.

Solution to Problem

A tire according to a first aspect of the present invention includes a pattern region, and plural unit patterns. The pattern region is formed at an outer surface of a tire and includes a base. The plural unit patterns are formed within the pattern region, and each of the unit patterns including a bend point and extension portions having a projection height from the base of from 0.1 mm to 1.0 mm. The extension portions extend in plural directions from the bend point in plan view. A spacing between bend points of adjacent unit patterns among the plurality of unit patterns is from 0.2 mm to 1.0 mm.

The pattern region that includes the base is formed at the outer surface of the tire according to the first aspect. The outer surface of the tire refers to a surface that can be seen from outside the tire, and encompasses a tire side portion, a tread portion, and groove bottoms or groove walls of a tread. The tire of the present invention encompasses both pneumatic tires and non-pneumatic tires.

The plural unit patterns are formed with the pattern region. Each unit pattern is formed including the extension portions having a projection height from the base of from 0.1 mm to 1.0 mm, and extending in plural directions from the bend point in plan view. The spacing between the bend points of adjacent unit patterns is from 0.2 mm to 1.0 mm. Forming the unit patterns to the base in this manner enables reflection of light that is incident to the pattern region to be suppressed, enabling contrast to be created between the pattern region and the exterior of the pattern region.

In a tire according to a second aspect, for the adjacent unit patterns, in plan view at least one of the extension portions of one of the unit patterns extends in a different direction to all of the extension portions of another of the unit patterns.

By providing the extension portions of the adjacent unit patterns in different directions to each other in this manner, the reflection direction of light reflected from the pattern region can be made to differ, thus suppressing a concentration of reflected light. This raises the uniformity of the appearance of the patterned section when viewed from different angles, enabling visibility of the outer surface of the tire to be enhanced.

In a tire according to a third aspect, in plan view, a maximum length of each of the unit patterns is larger than the spacing between the bend points of the adjacent unit patterns.

Configuring the maximum length in the unit patterns in plan view so as to be larger than the spacing between the bend points of the adjacent unit patterns in this manner makes it easier to arrange the unit patterns close together, thereby enabling the unit patterns to be densely arranged in the pattern region. Arranging the unit patterns densely further suppresses light reflection from the pattern region, enabling visibility to be enhanced.

In a tire according to a fourth aspect, three or more of the extension portions are present in each at the unit patterns, and respective angles formed between the adjacent extension portions are the same.

The extension portions are able to offer each other well-balanced support as a result of arranging the extension portions of the unit patterns in this manner. Accordingly, the spacings of the unit patterns are less liable to tilt over than in cases in which the angles formed between the extension portions are not the same angles as each other, thereby enabling the durability of the unit patterns to be enhanced.

In a tire according to a fifth aspect, one of the unit patterns and an adjacent unit pattern, of the plurality of unit patterns, are connected together by a connecting portion.

In the tire according to the fifth aspect, one of the unit patterns and another unit pattern adjacent thereto are connected together by the connecting portion. The unit patterns thus support each other through the connecting portion, suppressing the unit patterns from tilting inward, and enabling durability to be enhanced.

In a tire according to a sixth aspect, the connecting portion connects together the plural unit patterns such that plural of the unit patterns are continuous with each other from one end to another end of the pattern region.

Making plural of the unit patterns continuous to each other from one end to the other end of the pattern region in this manner allows air to escape to the exterior of the pattern region through end portions of the continuous unit patterns during vulcanization when manufacturing the tire in a mold. This enables cavities caused by trapped air to be suppressed from arising within the pattern region, thus improving molding characteristics.

In a tire according to a seventh aspect, all of the unit patterns within the pattern region are in communication with an end portion of the pattern region.

Configuring all of the unit patterns within the pattern region in communication with the end portion of the pattern region in this manner enables cavities caused by trapped air to be further suppressed from arising within the pattern region.

In a tire according to an eighth aspect, a continuous zigzag is formed by the extension portions of the connected unit patterns.

Here, a "zigzag" refers to a bent line shape that extends along extension portions extending in different directions to each other with respect to a direction from one end to another end of the pattern region in adjacent unit patterns.

Using the extension portions to form a continuous zigzag shape in this manner enables the reflection angles in which light is reflected to be made to differ despite the continuity, enabling a concentration of reflected light to be suppressed. This thereby raises the uniformity of the appearance of the patterned section when viewed from different angles, enabling visibility to be enhanced.

In a tire according to a ninth aspect, the extension portions each include an apex that is convexly curved at a projection leading end side of the extension portions.

In the tire according to the ninth aspect, the extension portions each include an apex that is curved so as to be convex toward the tire outside. Curving the apex so as to be convex on the projection leading end side in this manner enables the directions of reflected light to be dispersed to a greater extent than in cases in which the apexes have flat faces. The reflection directions in which light is reflected by the pattern region are thus varied, thereby suppressing a concentration of reflected light. This thereby raises the uniformity of the appearance of the patterned section when viewed from different angles, enabling visibility to be enhanced.

In a tire according to a tenth aspect, at least one of the extension portions of the unit patterns has a curved shape.

In the tire according to the tenth aspect, at least one of the extension portion of the unit patterns has a curved shape, thereby suppressing a concentration of reflected light reflected by the extension portion. This thereby raises the uniformity of the appearance when viewed from different angles, enabling visibility to be enhanced. Moreover, a bottom face of the base becomes more difficult to see due to the extension portion having a curving shape, enabling reflection of light incident to the pattern region to be suppressed.

In a tire according to an eleventh aspect, the at least one of the extension portions having a curved shape curves such that a leading end of the at least one of the extension portions approaches one of the extension portion of another of the unit patterns.

Due to configuring the leading end of the curved extension portion to curve so as to approach an extension portion of another of the unit patterns in this manner, the bottom face of the base becomes more difficult to see between the curved extension portion and the other extension portion that it approaches, enabling reflection of light incident to the pattern region to be suppressed.

In a tire according to a twelfth aspect, the pattern region is formed at a tire side portion.

The tire side portion can be seen even after the tire has been fitted to a vehicle. Forming the pattern region that generates increased contrast thereby enables the external appearance to be further enhanced.

In a tire according to a thirteenth aspect, the pattern region is formed in a groove of a tread.

Here, the groove of the tread encompasses a groove bottom and groove walls. Forming the pattern region in the groove of the tread increases the contrast between the contact surface of the tread and the groove of the tread, making the groove appear deeper, and thus enabling the external appearance of the tread to be further enhanced.

Advantageous Effects of the Invention

The present invention is capable of raising the uniformity of the appearance of the patterned section when viewed from different angles, enabling visibility to be enhanced in a pattern region on an outer surface of a tire.

BRIEF DESCRIPTION OF DRAWINGS

FIG. 5 is an enlarged diagram of a portion of a design on a tire according to the first exemplary embodiment.

DESCRIPTION OF EMBODIMENTS

First Exemplary Embodiment

Figure 1:
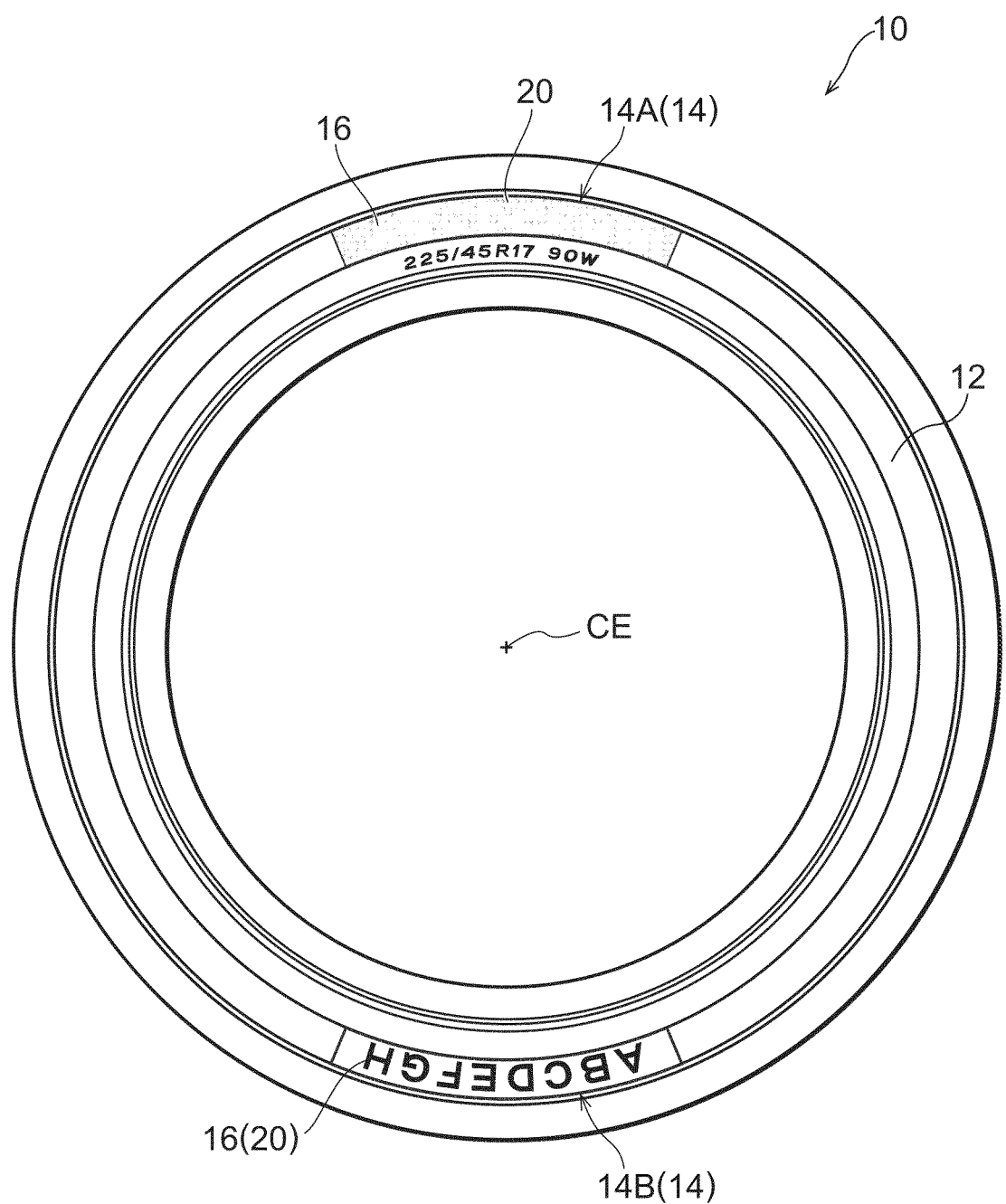
FIG. 1 is a side view of a tire according to a first exemplary embodiment.

Explanation follows regarding a first exemplary embodiment of the present invention, with reference to the drawings. FIG. 1 is a side view illustrating a tire 10 according to the present exemplary embodiment. In the present exemplary embodiment, a tire circumferential direction is indicated by C, and a tire radial direction is indicated by R.

A tire side portion 12 of the tire 10 is formed with designs 14. The designs 14 are configured in belt shaped circular arcs, and are formed at two locations at symmetrical positions on either side of a tire center axis CE (see FIG. 1). A pattern region 20 and a text region 16 are arranged within the design 14. The text region 16 displays text, such as "ABCDEFGH", displayed in a smooth plane. In the design 14A on the upper side of the page in FIG. 1, the pattern region 20 configures a type of decorative strip at locations that are not part of the text region 16 of the design 14A, and is formed so as to surround the text region 16. On the other hand, in the design 14B on the lower side of the page in FIG. 1, the pattern region 20 is the same region as the text region 16 of the design 14B, and portions that are not within the text region 16 of the design 14B are configured similarly to the outer surface of the tire side portion 12 not within the designs 14. In the present exemplary embodiment, explanation is given regarding the design 14A. Note that the design 14 including the pattern region 20 may be formed using laser processing to provide corresponding recesses and projections inside a tire mold. Moreover, the pattern region 20 is preferably disposed further to the tire radial direction R outside than a maximum width portion of the tire (a portion where the straight-line distance between tire side portions is greatest).

Figure 2:
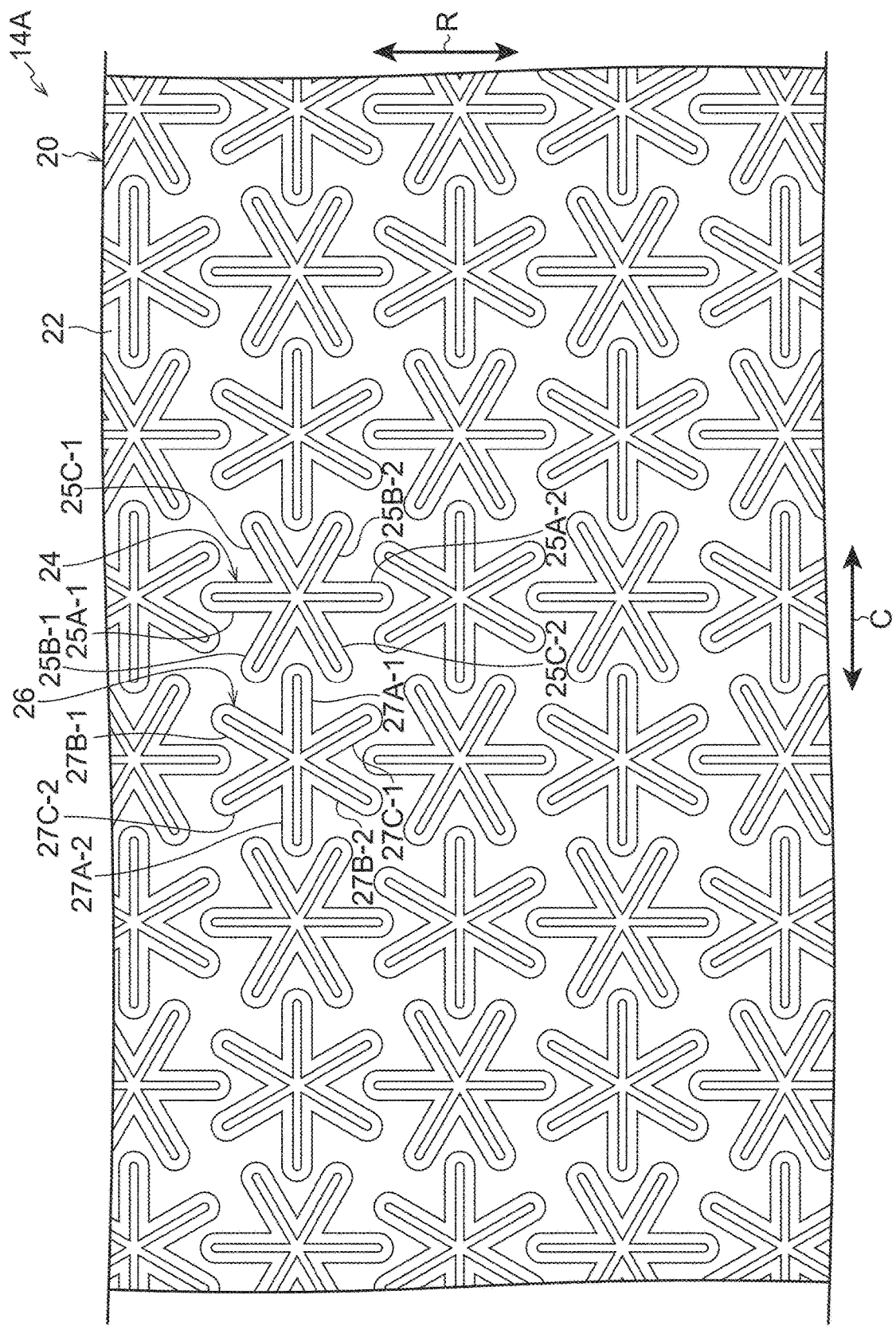
FIG. 2 illustrates a portion of a pattern region of a tire according to the first exemplary embodiment.

As illustrated in FIG. 2, the pattern region 20 includes a base 22. The base 22 forms a bottom face in the pattern region 20, and first asterisk projections 24 and second asterisk projections 26 are formed as unit patterns projecting out from the base 22. Note that from the perspective of air resistance, the first asterisk projections 24 and the second asterisk projections 26 preferably do not project out from the surface of the tire side portion 12 (the surface not within the design 14).

Figure 3:
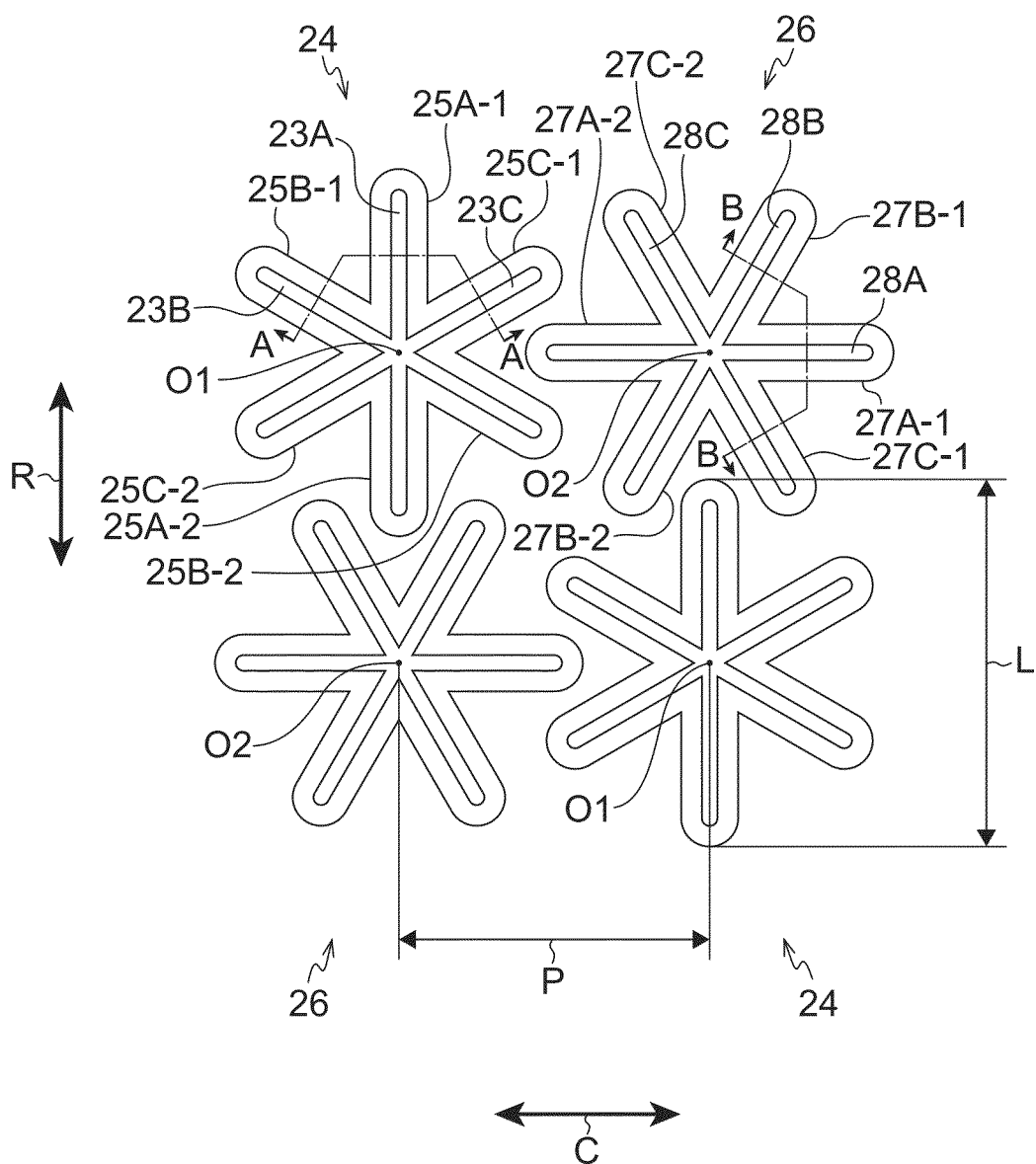
FIG. 3 is an enlarged diagram of a portion of a pattern region of a tire according to the first exemplary embodiment.

As illustrated in FIG. 3, each first asterisk projection 24 is configured by first extension portions 25A-1, 25A-2, second extension portions 25B-1, 25B-2, and third extension portions 25C-1, 25C-2, each having the same shape but extending in a straight line in a different direction from a center O1, serving as a bend point. In the following explanation, the six extension portions are referred to collectively as the "extension portions 24E". A linear shape that bends at the center O1 is configured by any one of the extension portions 24E and another of the extension portions 24E (with the exception of extension portions 24E extending in opposite directions to each other from the center O1). The first extension portion 25A-1 and the first extension portion 25A-2 extend in opposite directions to each other from the center O1, such that the first extension portion 25A-1 and the first extension portion 25A-2 configure a continuous straight line shape. In the following explanation, the first extension portion 25A-1 and the first extension portion 25A-2 are referred to collectively as the "first extension portions 25A". Likewise, the second extension portion 25B-1 and the second extension portion 25B-2 extend in opposite directions to each other from the center O1, such that the second extension portion 25B-1 and the second extension portion 25B-2 configure a continuous straight line shape. In the following explanation, the second extension portion 25B-1 and the second extension portion 25B-2 are referred to collectively as the "second extension portions 25B". Likewise, the third extension portion 25C-1 and the third extension portion 25C-2 extend in opposite directions to each other from the center O1, such that the third extension portion 25C-1 and the third extension portion 25C-2 configure a continuous straight line shape. In the following explanation, the third extension portion 25C-1 and the third extension portion 25C-2 are referred to collectively as the "third extension portions 25C".

Each of the six extension portions 24E forms angles of 60° with the adjacent extension portions 24E. In other words, in the first asterisk projection 24, the six extension portions 24E form a shape extending from the center O1 in a radial pattern. In the first asterisk projection 24, the first extension portion 25A-1 and the first extension portion 25A-2 extend substantially along the tire radial direction R.

Figure 4A:
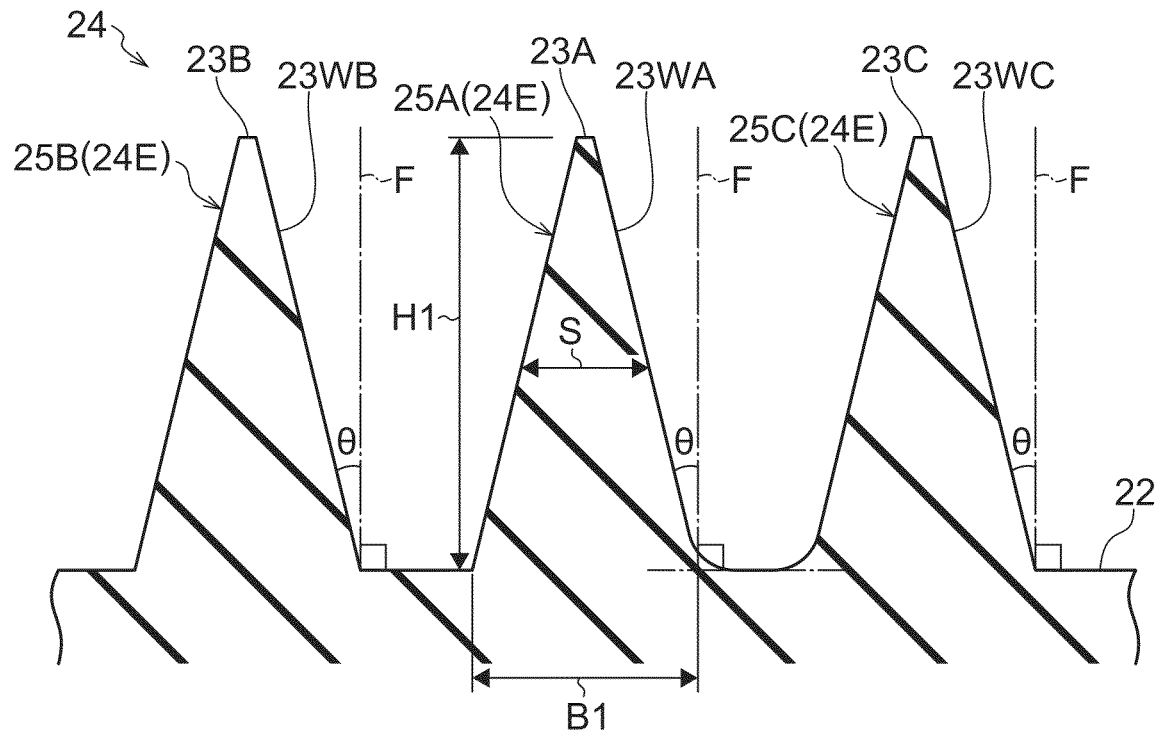
FIG. 4A is a cross-section taken along line A-A in FIG. 3.
Figure 4B:
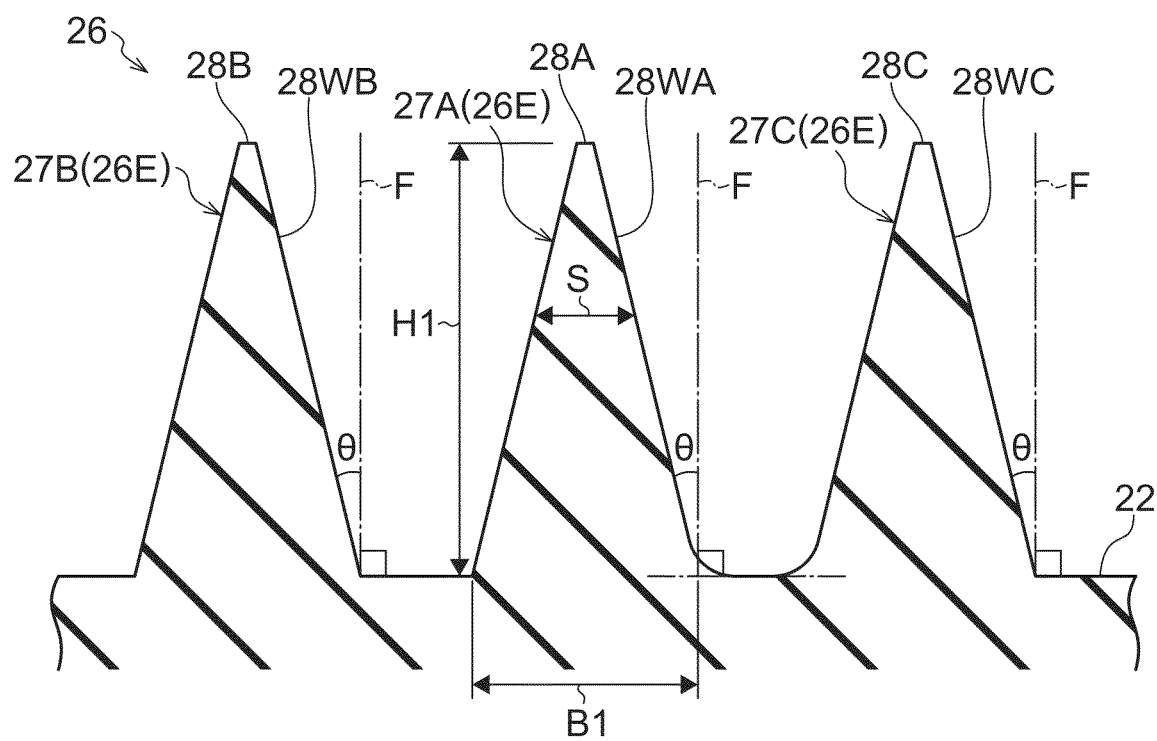
FIG. 4B is a cross-section taken along line B-B in FIG. 3.

As illustrated in FIG. 4A and FIG. 4B, in the first asterisk projection 24, each of the extension portions 24E is configured with a substantially isosceles triangle shaped cross-section profile having a flattened apex as sectioned in a direction orthogonal to the extension direction of the extension portion 24E. In the following explanation, the apexes of the first extension portions 25A are referred to as first apexes 23A, the apexes of the second extension portions 25B are referred to as second apexes 23B, and the apexes of the third extension portion 25C are referred to as third apexes 23C. The height from the base 22 to each of the first apexes 23A, the second apexes 23B, and the third apexes 23C (referred to below as the "projection height H1") is set from 0.1 mm to 1.0 mm. In the following explanation, the first apexes 23A, the second apexes 23B, and the third apexes 23C are referred to collectively as the first apexes 23A to the third apexes 23C. Note that the projection height H1 is more preferably set in a range from 0.2 mm to 0.8 mm.

As illustrated in FIG. 4A, in the first asterisk projection 24, the base 22 has a flat profile between the first extension portions 25A and the second extension portions 25B, and the base 22 has a curved face profile between the first extension portions 25A and the third extension portion 25C. Moreover, as illustrated in FIG. 4B, in the second asterisk projection 26, described later, the base 22 has a flat profile between first extension portions 27A and second extension portions 27B, and the base 22 has a curved face profile between the first extension portions 27A and third extension portions 27C. Configuring the base 22 with a curved face profile suppresses reflection of incident light, thus increasing the contrast with the exterior of the pattern region 20, and enhancing visibility.

A distance S between the side wall faces on either side increases on progression from the apex side toward the base 22, as viewed in cross-section taken orthogonally to the respective extension directions of a first side wall face 23WA configuring an inclined edge of the isosceles triangle profile of the first extension portion 25A, a second side wall face 23WB configuring an inclined edge of the isosceles triangle profile of the second extension portion 25B, and a third side wall face 23WC configuring an inclined edge of the isosceles triangle profile of the third extension portion 25C. The first side wall face 23WA, the second side wall face 23WB, and the third side wall face 23WC each form an angle $\theta$ with respect to a hypothetical perpendicular plane F that is perpendicular to the base 22. The angle $\theta$ is preferably set within a range from 5° to 30°, and is more preferably set within a range from 15° to 25°. If the angle $\theta$ is an angle larger than 30°, the proportion of light reflected by the first side wall face 23WA to the third side wall face 23WC that returns to the outside from between the extension portions 24E becomes greater, detracting from the enhancement in visibility. Namely, light is reflected, reducing the difference in contrast with the exterior of the pattern region 20, and thus detracting from the enhancement in visibility. On the other hand, if the angle $\theta$ is an angle smaller than 5°, the extension portions 24E become liable to tilt over. Accordingly, in consideration of the effect of suppressing light incident between the extension portions 24E from being reflected and returning to the outside from between the extension portions 24E, and also in consideration of the durability of the extension portions 24E, the angle $\theta$ is preferably set to from 5° to 30°.

Moreover, in the extension portions 24E, the projection height H1 is preferably 0.8 to 6 times a base edge length B1 of the isosceles triangle (the distance between bases of the side wall faces at the base 22). If the projection height H1 is less than 0.8 times the base edge length B1, the proportion of light reflected at the first side wall face 23WA to the third side wall face 23WC that returns to the outside from between the extension portions 24E becomes greater, detracting from the enhancement in visibility. Namely, light is reflected, reducing the difference in contrast with the exterior of the pattern region 20, and thus detracting from the enhancement in visibility. On the other hand, if the projection height H1 is greater than 6 times the base edge length B1, the first side wall face 23WA to the third side wall face 23WC form an angle that is almost perpendicular to the base 22, making the extension portions 24E liable to tilt over. Accordingly, in consideration of the effect of suppressing reflected light of the light incident between the extension portions 24E from returning to the outside from between the extension portions 24E, and also in consideration of the durability of the extension portions 24E, the projection height H1 is preferably from 0.8 times to 6 times the base edge length B1.

The second asterisk projections 26 have the same shape as the first asterisk projections 24, and in plan view, the second asterisk projections 26 are arranged rotated 90° about the center O1 with respect to the first asterisk projections 24. In each second asterisk projection 26, portions respectively corresponding to the first extension portions 25A-1, 25A-2, the second extension portions 25B-1, 25B-2, the third extension portions 25C-1, 25C-2, and the center O1 of the first asterisk projection 24 are referred to as first extension portions 27A-1, 27A-2, second extension portions 27B-1, 27B-2, third extension portions 27C-1, 27C-2, and a center O2. In the following explanation, the six extension portions above are referred to collectively as the "extension portions 26E". Moreover, portions corresponding to the first apexes 23A, the second apexes 23B, and the third apexes 23C are referred to as first apexes 28A, second apexes 28B, and third apexes 28C. In the following explanation, the first apexes 28A, the second apexes 28B, and the third apexes 28C are referred to collectively as the first apexes 28A to the third apexes 28C. Moreover, portions corresponding to the first side wall faces 23WA, the second side wall faces 23WB, and the third side wall faces 23WC are referred to as first side wall faces 28WA, second side wall faces 28WB, and third side wall faces 28WC. In the following explanation, the first side wall faces 23WA, the second side wall faces 23WB, and the third side wall faces 23WC are referred to collectively as the first side wall faces 23WA to the third side wall faces 23WC, and the first side wall faces 28WA, the second side wall faces 28WB, and the third side wall faces 28WC are referred to collectively as the first side wall faces 28WA to the third side wall faces 28WC. Due to arranging the second asterisk projections 26 as described above, the respective extension portions 24E and the respective extension portions 26E extend in different directions to each other.

The first asterisk projections 24 and the second asterisk projections 26 are lined up alternately in rows along both the tire radial direction R and the tire circumferential direction C so as to cover the entire pattern region 20. Leading ends of the first extension portions 25A-1, 25A-2 of the first asterisk projections 24 are respectively inserted between the second extension portions 27B-2 and the third extension portions 27C-1, and between the second extension portions 27B-1 and the third extension portions 27C-2, of the second asterisk projections 26 adjacent in the tire radial direction R. Leading ends of the first extension portions 27A-1, 27A-2 of the second asterisk projections 26 are respectively inserted between the second extension portions 25B-1 and the third extension portions 25C-2, and between the second extension portions 25B-2 and the third extension portions 25C-1, of the first asterisk projections 24 adjacent in the tire circumferential direction C.

A spacing (referred to below as a "spacing P") between the center O1 and the center O2 of the first asterisk projections 24 and the second asterisk projections 26 adjacent in the tire radial direction R and in the tire circumferential direction C is set to from 0.2 mm to 1.0 mm. An extension direction length from the leading end of the first extension portion 25A-1 to the leading end of the first extension portion 25A-2, an extension direction length from the leading end of the second extension portion 25B-1 to the leading end of the second extension portion 25B-2, and an extension direction length from the leading end of the third extension portion 25C-1 to the leading end of the third extension portion 25C-2 are equal to each other, and in plan view, this configures the maximum length in the first asterisk projection 24. This length is referred to below as the "extension length L". The extension length L is set longer than the spacing P. Note that an extension direction length from the leading end of the first extension portion 27A-1 to the leading end of the first extension portion 27A-2, an extension direction length from the leading end of the second extension portion 27B-1 to the leading end of the second extension portion 27B-2, and an extension direction length from the leading end of the third extension portion 27C-1 to the leading end of the third extension portion 27C-2 configure the maximum length in the second asterisk projection 26 in plan view, and are the same length as the extension length L. If the spacing P is less than 0.2 mm, the lengths of the extension portions 24E, 26E become too short, making molding characteristics difficult to secure during manufacture. On the other hand, if the spacing P exceeds 1.0 mm, the first asterisk projection 24 and the second asterisk projection 26 are not arranged densely, detracting from the enhancement in visibility of the pattern region 20 due to light being reflected from the base 22. The spacing P is therefore set from 0.2 mm to 1.0 mm. Note that the spacing P is more preferably set within a range of from 0.2 mm to 0.8 mm. Adjacent first asterisk projections 24 and second asterisk projections 26 are arranged discretely to each other.

Next, explanation follows regarding operation and advantageous effects of the tire according to the present exemplary embodiment.

As described above, in the pattern region 20 of the tire side portion 12, light that is incident to the first asterisk projections 24 and the second asterisk projections 26 formed within the pattern region 20 hits the adjacent first side wall faces 23WA to third side wall faces 23WC and the first side wall faces 28WA to the third side wall faces 28WC. The light attenuates as it is reflected back and forth between the first side wall faces 23WA to third side wall faces 23WC and the first side wall faces 28WA to the third side wall faces 28WC. Accordingly, little light is reflected back outside the pattern region 20, such that the pattern region 20 appears black, as illustrated in FIG. 5, whilst other regions (the text region 16 and the rest of the tire side portion 12) appear white in comparison. This thereby enables contrast to be created between the pattern region 20 and the other regions. By increasing the contrast between the pattern region 20 and the text region 16 surrounded by the pattern region 20 as in the present exemplary embodiment, the text region 16 can be seen clearly, enabling visibility to be enhanced.

Moreover, in the pattern region 20 of the present exemplary embodiment, the first asterisk projections 24 and the second asterisk projections 26 are lined up alternately along the tire radial direction R and the tire circumferential direction C, and the extension portions 24E and the extension portions 26E extend in different directions to each other. This thereby enables the light reflected by the pattern region 20 to be reflected in different directions, thus suppressing a concentration of reflected light. This raises the uniformity of the appearance of the patterned section when viewed from different angles, enabling visibility to be enhanced.

Moreover, in the present exemplary embodiment, the extension length L is longer than the spacing P between the adjacent first asterisk projections 24 and second asterisk projections 26. This makes it easier to arrange the first asterisk projection 24 and the second asterisk projection 26, serving as unit patterns, close together, enabling the unit patterns to be densely arranged in the pattern region 20. Arranging the unit patterns densely further suppresses light reflection from the pattern region 20, enabling visibility to be enhanced.

Moreover, in the present exemplary embodiment, the first asterisk projections 24 are configured by the six extension portions 24E that are connected together at the center O1 and that extend in different directions to each other. The second asterisk projections 26 are configured by the six extension portions 26E that are connected together at the center O2 and that extend in different directions to each other. The first asterisk projections 24 and the second asterisk projections 26 are therefore not liable to tilt over, enabling the durability of the individual first asterisk projections 24 and second asterisk projections 26 to be enhanced. Moreover, since the extension portions 24E, 26E extend in different directions to each other within the same unit pattern (first asterisk projection 24, second asterisk projection 26), the angle of reflection of reflected light can be varied, suppressing concentration of reflected light. This raises the uniformity of the appearance of the patterned section when viewed from different angles, enabling visibility to be enhanced.

Moreover, the first asterisk projection 24 and the second asterisk projection 26 are disposed independently of each other (discretely to one other), enabling the propagation of cracks to be suppressed should cracks occur in the pattern region 20.

Moreover, in the first asterisk projections 24 and the second asterisk projections 26, the angles formed between the extension portions 24E and the extension portions 26E are configured as uniform angles (60°). The extension portions 24E and the extension portions 26E thus offer each other well-balanced support, such that the first asterisk projection 24 and the second asterisk projection 26 are less liable to tilt over than in configurations in which the angles formed between the extension portions 24E and the extension portions 26E are not uniform angles, thereby enabling durability to be enhanced.

Moreover, the extension portions 24E and the extension portions 26E have substantially isosceles triangle cross-section profiles, and when the first to third side wall faces 23WA to 23WC, 28WA to 28WC are viewed in cross-section taken orthogonally to the respective extension directions, the distance S between the side wall faces on either side increases on progression from the apex side toward the base 22. Accordingly, the spacing between the adjacent apexes 23A to 23C, 28A to 28C is wider than a spacing on the base 22 side, allowing light to be incident between the extension portions 24E and between the extension portions 26E over a wide range. The light that is incident between the extension portions 24E and between the extension portions 26E is reflected back and forth between the side wall faces, enabling reflected light to be suppressed from returning to the outside from between the extension portions.

Moreover, configuring the cross-sections of the extension portions 24E and the extension portions 26E as sectioned in a direction orthogonal to their respective extension directions in the manner described above facilitates removal from the mold during manufacture, enabling molding characteristics to be enhanced. As a result, there is little inward tilting of the first asterisk projections 24 and the second asterisk projections 26, enabling durability to be enhanced.

Figure 6A:
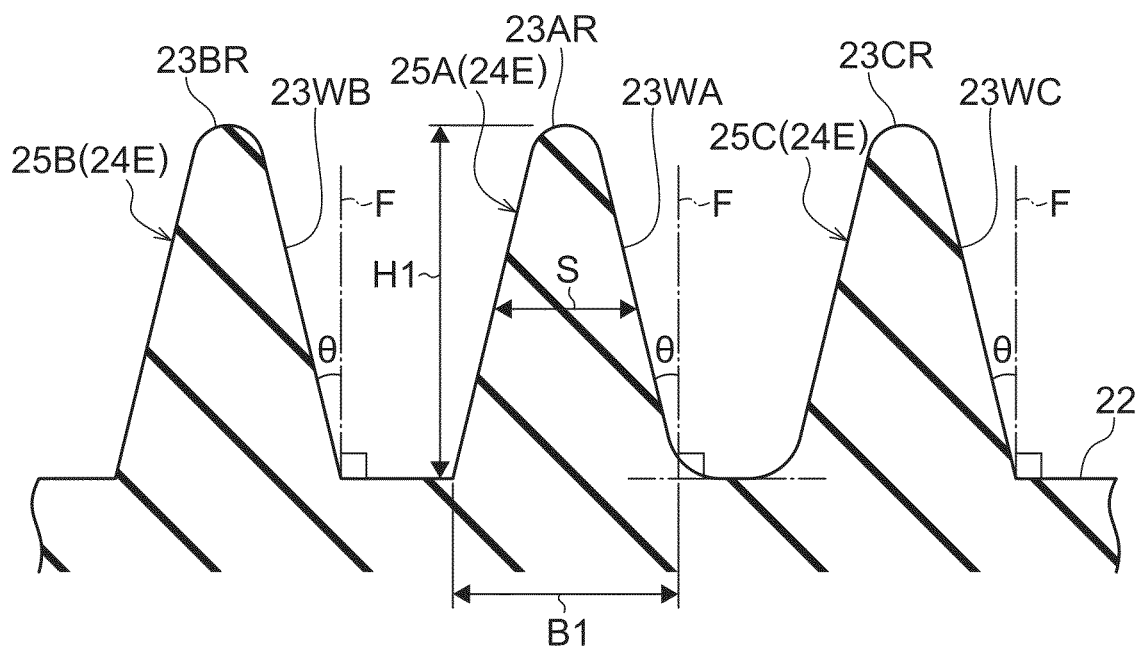
FIG. 6A is a cross-section of a portion corresponding to FIG. 4A in a tire according to a modified example of the first exemplary embodiment.
Figure 6B:
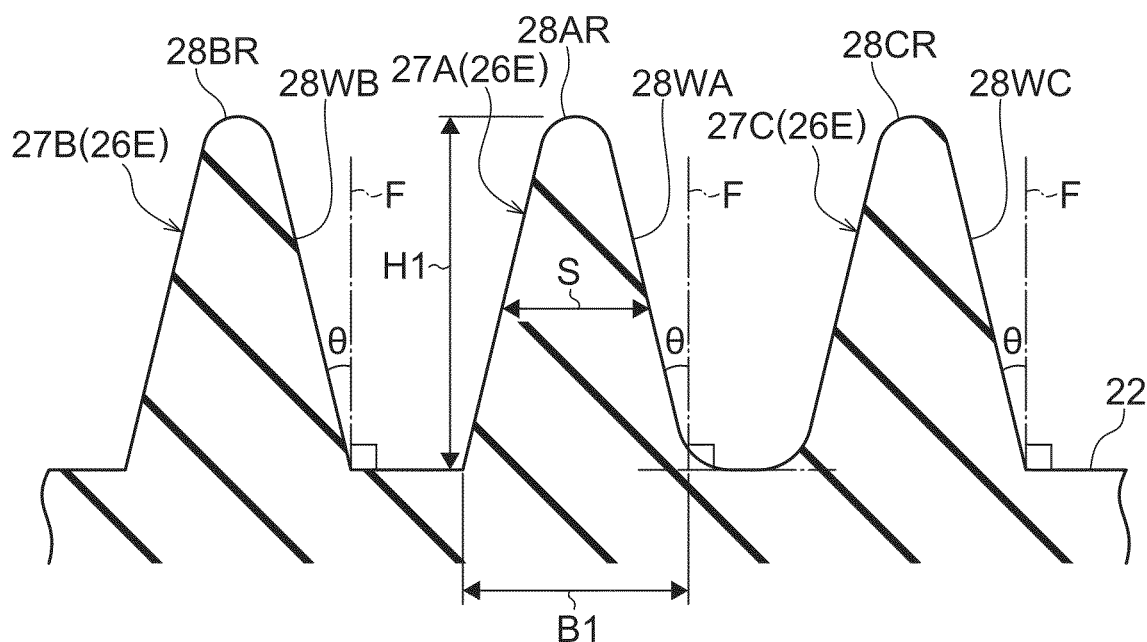
FIG. 6B is a cross-section of a portion corresponding to FIG. 4B in a tire according to a modified example of the first exemplary embodiment.

Note that in the present exemplary embodiment, the cross-sections of the extension portions 24E and the extension portions 26E as sectioned in a direction orthogonal to their respective extension directions are configured with substantially isosceles triangle profiles. However, configuration may be made with other shapes. As illustrated in FIG. 6A and FIG. 6B, for example, the vicinity of the first apexes 23A to the third apexes 23C and the first apexes 28A to the third apexes 28C may have curved face profiles to configure first apexes 23AR to third apexes 23CR, and first apexes 28AR to third apexes 28CR.

Figure 7A:
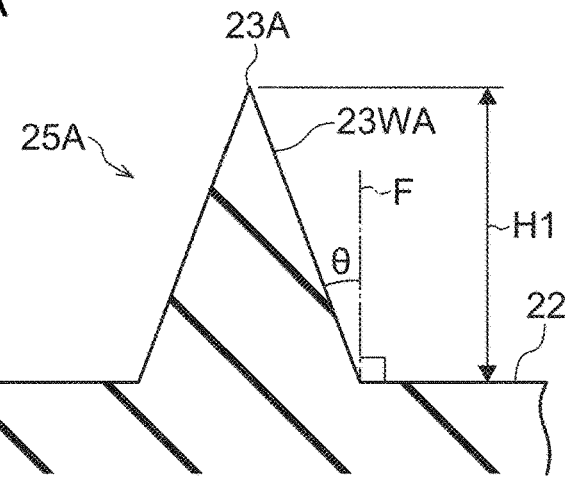
FIG. 7A is a cross-section of a first extension portion in a tire according to a modified example of the first exemplary embodiment.
Figure 7B:
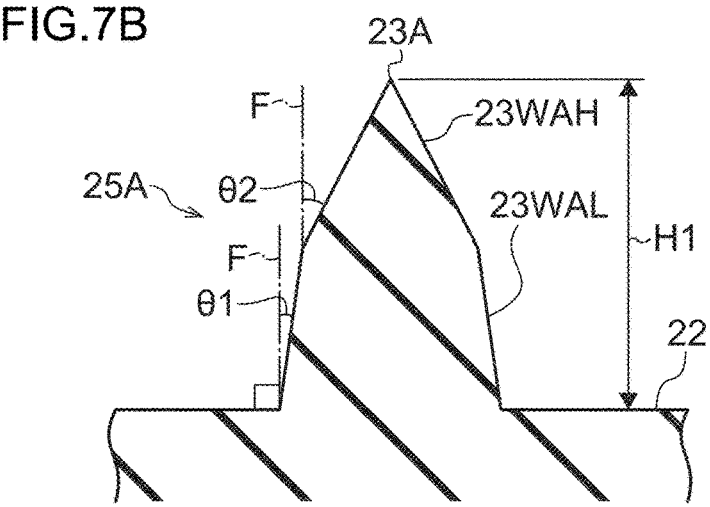
FIG. 7B is a cross-section of a first extension portion in a tire according to a modified example of the first exemplary embodiment.
Figure 7C:
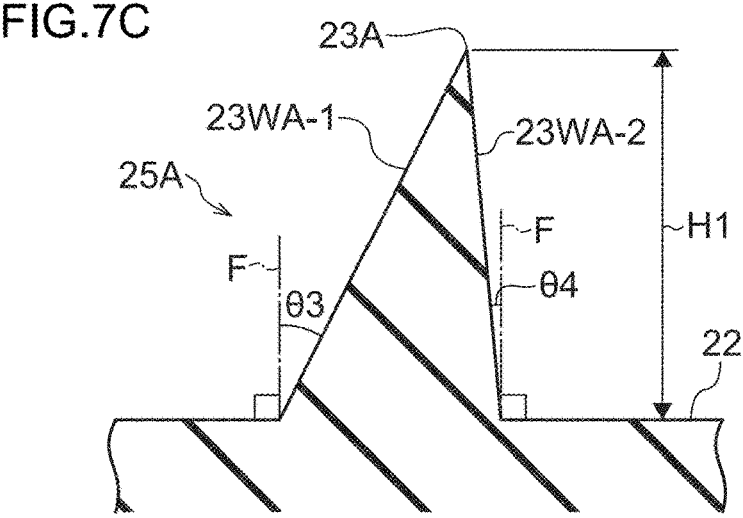
FIG. 7C is a cross-section of a first extension portion in a tire according to a modified example of the first exemplary embodiment.

Moreover, as illustrated in FIG. 7A, the cross-section profiles of the extension portions 24E and the extension portions 26E may be configured as isosceles triangles that come to a point at the apexes 23A to 23C. Configuring isosceles triangles that come to a point enables reflection by a flattened apex to be suppressed, enabling visibility to be enhanced. Moreover, as illustrated in FIG. 7B, an angle θ1 of a first side wall face 23WAL on the base 22 side may be set smaller than an angle θ2 on a first side wall face 23WAH on the apex side. Setting the angle θ1 smaller than the angle θ2 makes the extension portions 24E and the extension portions 26E less liable to tilt over, enabling durability to be enhanced. Moreover, as illustrated in FIG. 7C, an angle θ3 of one first side wall face 23WA-1 may be different to an angle θ4 of another first side wall face 23WA-2. Configuring the angle θ3 and the angle θ4 as different angles suppresses concentration of reflected light. This raises the uniformity of the appearance of the patterned section when viewed from different angles, enabling visibility to be enhanced. Moreover, in such cases, the projection height H1 from the base 22 to each of the first apexes 23A to the third apexes 23C and the first apexes 28A to the third apexes 28C is similarly set to 0.1 mm or greater. Note that only the first extension portion 25A is illustrated in FIG. 7A, FIG. 7B, and FIG. 7C.

Moreover, in the present exemplary embodiment, the unit patterns (first asterisk projection 24, second asterisk projection 26) are configured by the extension portions 24E and the extension portions 26E that extend in six directions each. However, a unit pattern may be formed by extension portions extending in two different directions, or a unit pattern may be formed by extension portions extending in three or more different directions. Moreover, in cases in which the extension portions extend in three or more different directions, the angles formed between adjacent extension portions may be uniform angles, or may be different angles. Configuring uniform angles such as in the present exemplary embodiment enables the extension portions to offer each other well-balanced support.

Second Exemplary Embodiment

Next, explanation follows regarding a second exemplary embodiment of the present invention. In the present exemplary embodiment, portions similar to those of the first exemplary embodiment are allocated the same reference numerals, and detailed explanation thereof is omitted.

Figure 8:
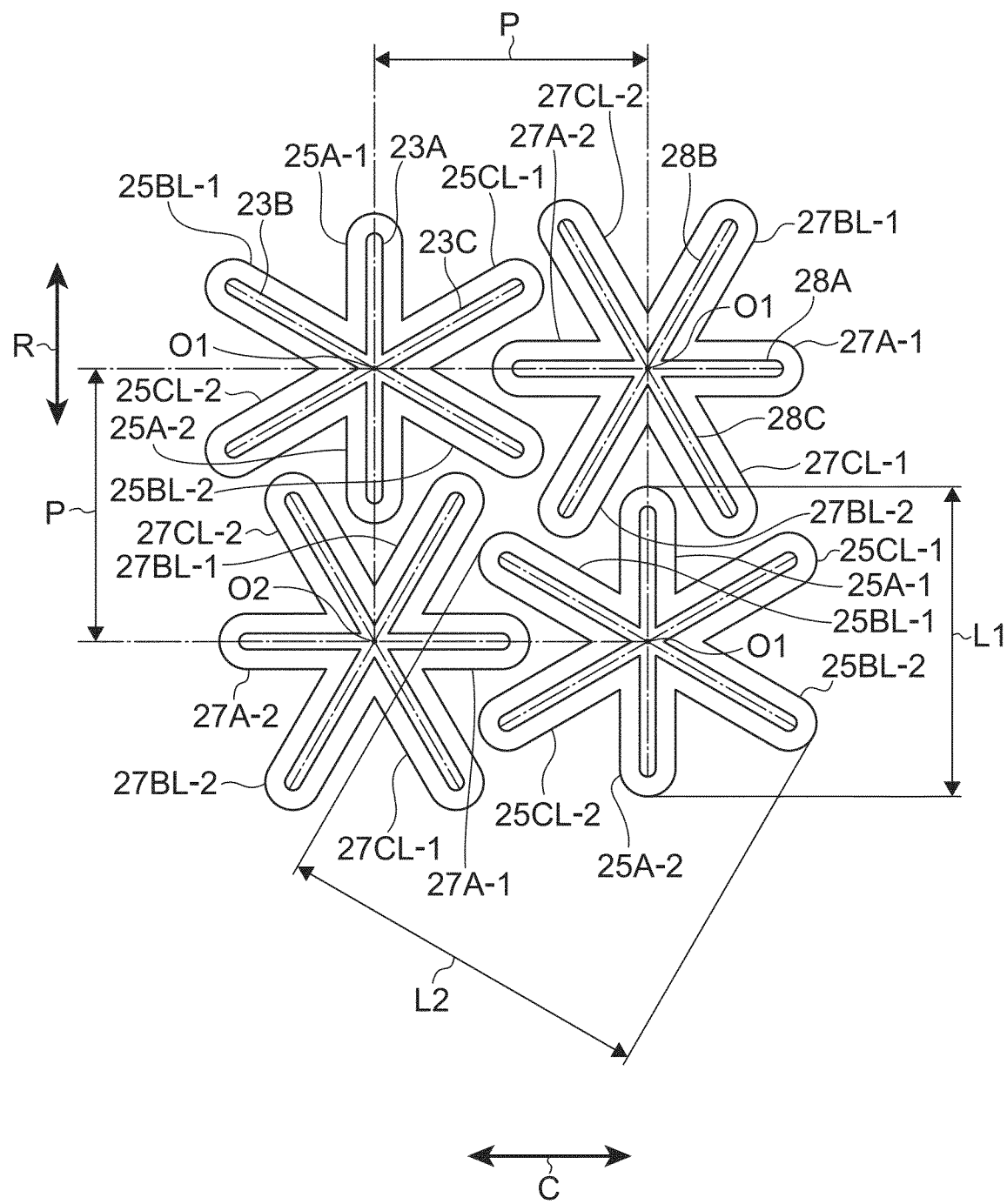
FIG. 8 is an enlarged diagram of a portion of a pattern region of a tire according to a second exemplary embodiment.

As illustrated in FIG. 8, the main difference in a tire 10 of the present exemplary embodiment is that in the first asterisk projection 24 and the second asterisk projection 26 of the first exemplary embodiment, an extension length L2 from the leading end of the second extension portion 25B-1 to the leading end of the second extension portion 25B-2, an extension length L2 from the leading end of the second extension portion 27B-1 to the leading end of the second extension portion 27B-2, an extension length L2 from the leading end of the third extension portion 25C-1 to the leading end of the third extension portion 25C-2, and an extension length L2 from the leading end of the third extension portion 27C-1 to the leading end of the third extension portion 27C-2 are longer than an extension length L1 from the leading end of the first extension portion 25A-1 to the leading end of the first extension portion 25A-2 and an extension length L1 from the leading end of the first extension portion 27A-1 to the leading end of the first extension portion 27A-2. In the present exemplary embodiment, the reference numerals of the second extension portions 25B, 27B and the third extension portions 25C, 26C are suffixed with the letter "L", to give second extension portions 25BL, 27BL, and third extension portions 25CL, 27CL.

Figure 9:
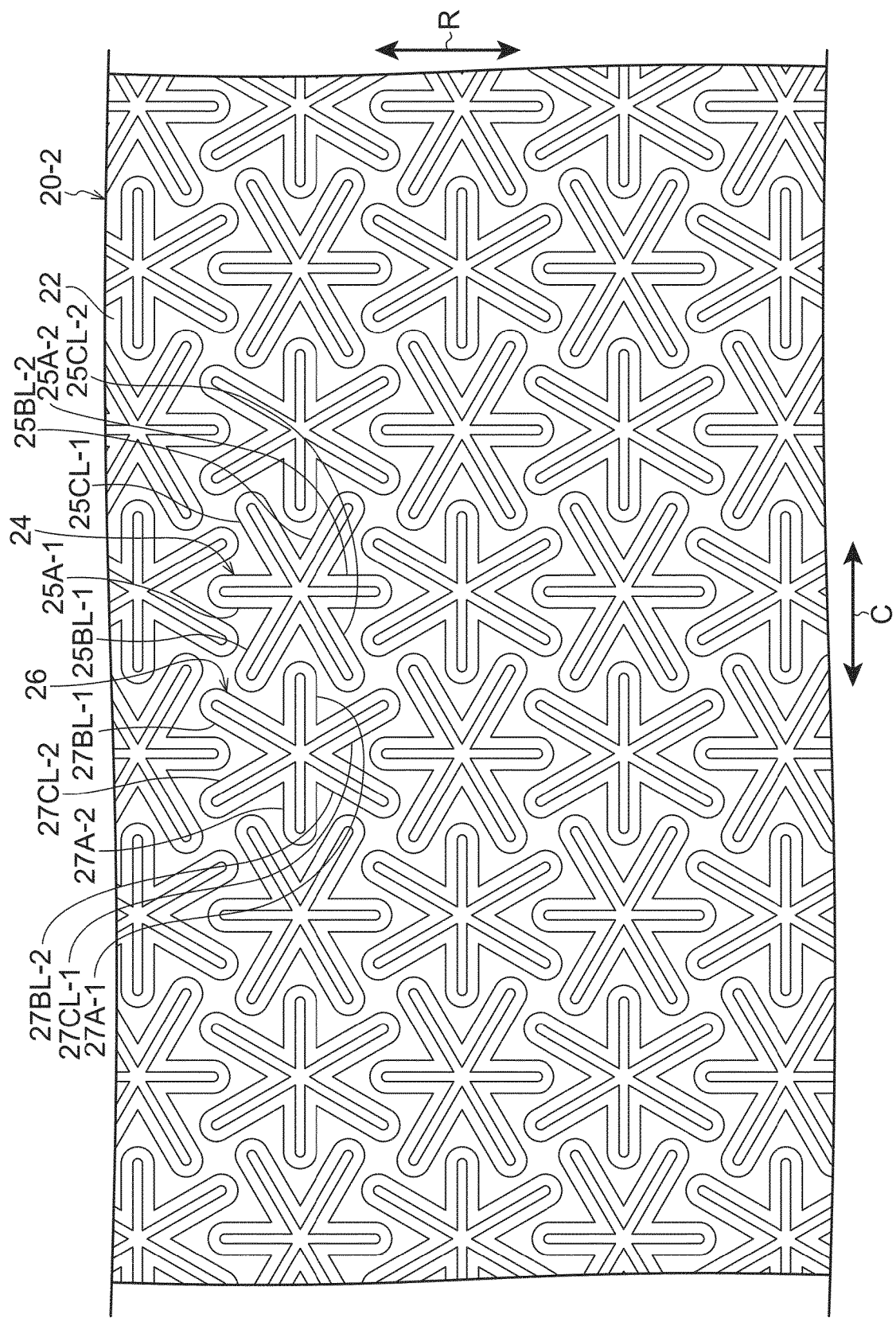
FIG. 9 illustrates a portion of a pattern region of a tire according to the second exemplary embodiment.

As also illustrated in FIG. 9, the second extension portions 25BL of the first asterisk projection 24 are inserted between the first extension portions 27A and the second extension portions 27BL of the adjacent second asterisk projections 26. The third extension portions 25CL of the first asterisk projection 24 are inserted between the first extension portions 27A and the third extension portions 27CL of the adjacent second asterisk projections 26. The second extension portions 27BL of the second asterisk projection 26 are inserted between the first extension portions 25A and the second extension portions 25BL of the adjacent first asterisk projections 24. The third extension portions 27CL of the second asterisk projection 26 are inserted between the first extension portions 25A and the third extension portions 25CL of the adjacent first asterisk projections 24.

In a pattern region 20-2 of the present exemplary embodiment, the extension length L2 of the second extension portions 25BL, 27BL and the third extension portions 25CL, 26CL is set longer than the extension length L1 of the first extension portions 25A, 27A, thereby reducing the surface area of flat portions of the base 22. This thereby enables the directions in which light incident to the pattern region 20-2 is reflected to be varied, suppressing a concentration of reflected light. This thereby raises the uniformity of the appearance of the patterned section when viewed from different angles, enabling visibility to be enhanced.

Third Exemplary Embodiment

Figure 10:
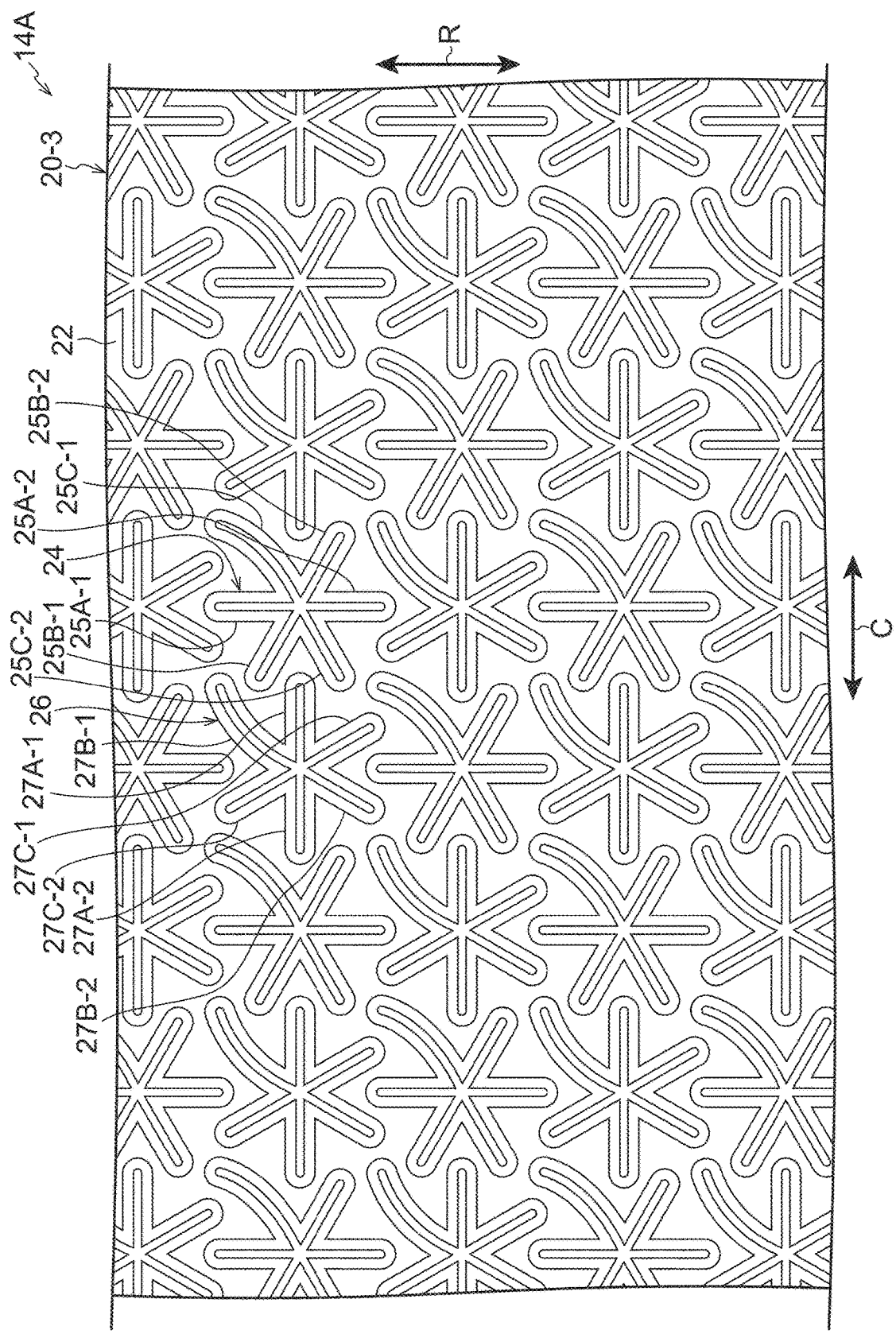
FIG. 10 illustrates a portion of a pattern region of a tire according to a third exemplary embodiment.
Figure 11:
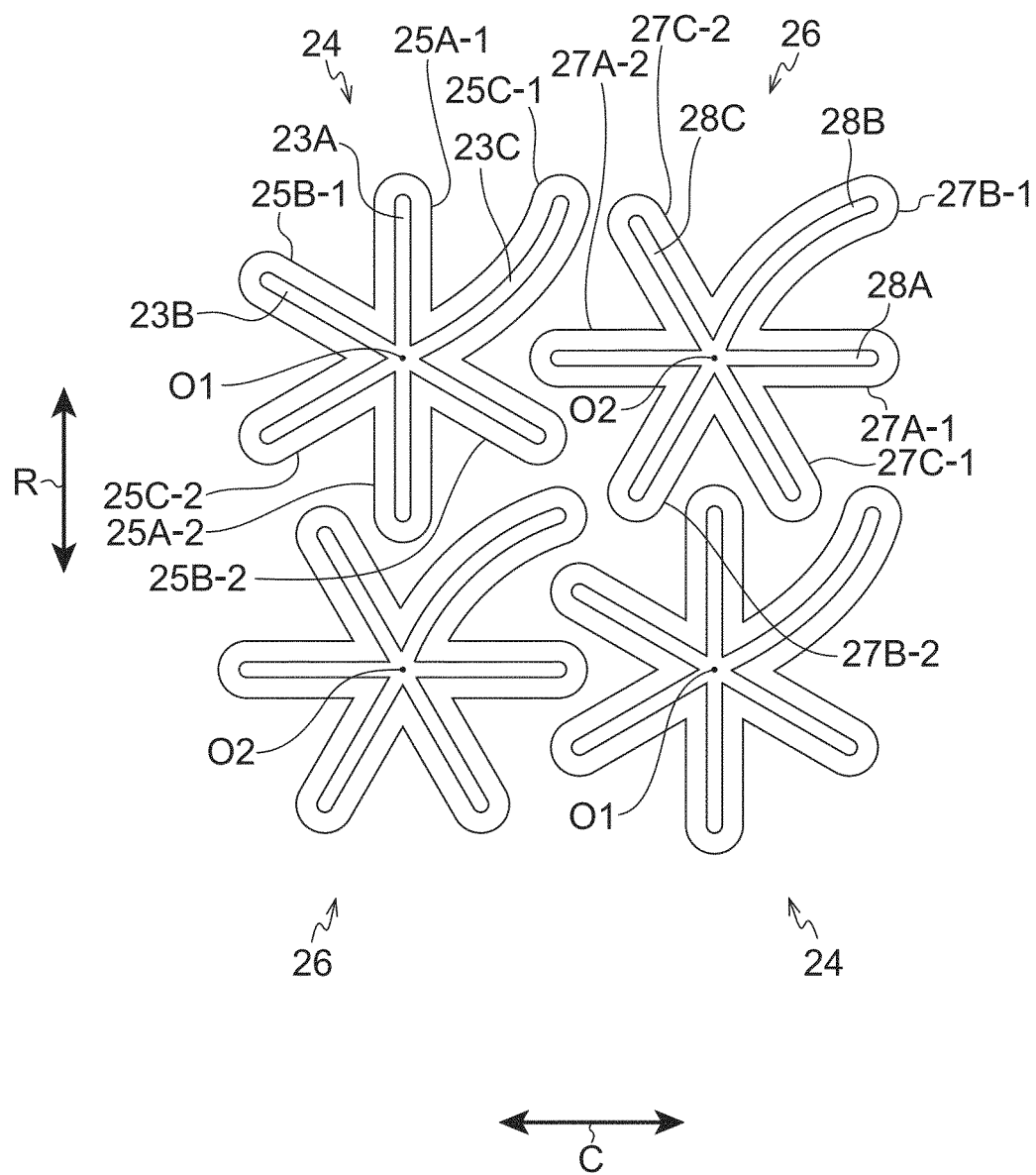
FIG. 11 is an enlarged diagram of a portion of a pattern region of a tire according to the third exemplary embodiment.

In a tire 10 of the present exemplary embodiment, as illustrated in FIG. 10, the third extension portion 25C-1 of the first asterisk projection 24 of the first exemplary embodiment is curved so as to approach the leading end of the third extension portion 25C-2 of another, adjacent first asterisk projection 24. As illustrated in FIG. 11, the extension length of the third extension portion 25C-1 is longer than that of the other extension portions. Moreover, in the tire 10 of the present exemplary embodiment, the second extension portion 27B-1 of the second asterisk projection 26 of the first exemplary embodiment is curved so as to approach the leading end of the second extension portion 27B-2 of another, adjacent second asterisk projection 26. The extension length of the second extension portion 27B-1 is longer than that of the other extension portions.

In a pattern region 20-3 of the present exemplary embodiment, the third extension portion 25C-1 and the second extension portion 27B-1 are curved, thereby suppressing a concentration of reflected light reflected by the third extension portion 25C-1 and the second extension portion 27B-1. This thereby raises the uniformity of the appearance when viewed from different angles, enabling visibility to be enhanced. Moreover, since the third extension portion 25C-1 and the second extension portion 27B-1 have longer extension lengths, the bottom face of the base 22 becomes more difficult to see, enabling reflection of light incident to the pattern region 20-3 to be suppressed.

Fourth Exemplary Embodiment

Explanation follows regarding a fourth exemplary embodiment of the present invention, with reference to the drawings. In the present exemplary embodiment, portions similar to those of the first or second exemplary embodiments are allocated the same reference numerals, and detailed explanation thereof is omitted.

Figure 12:
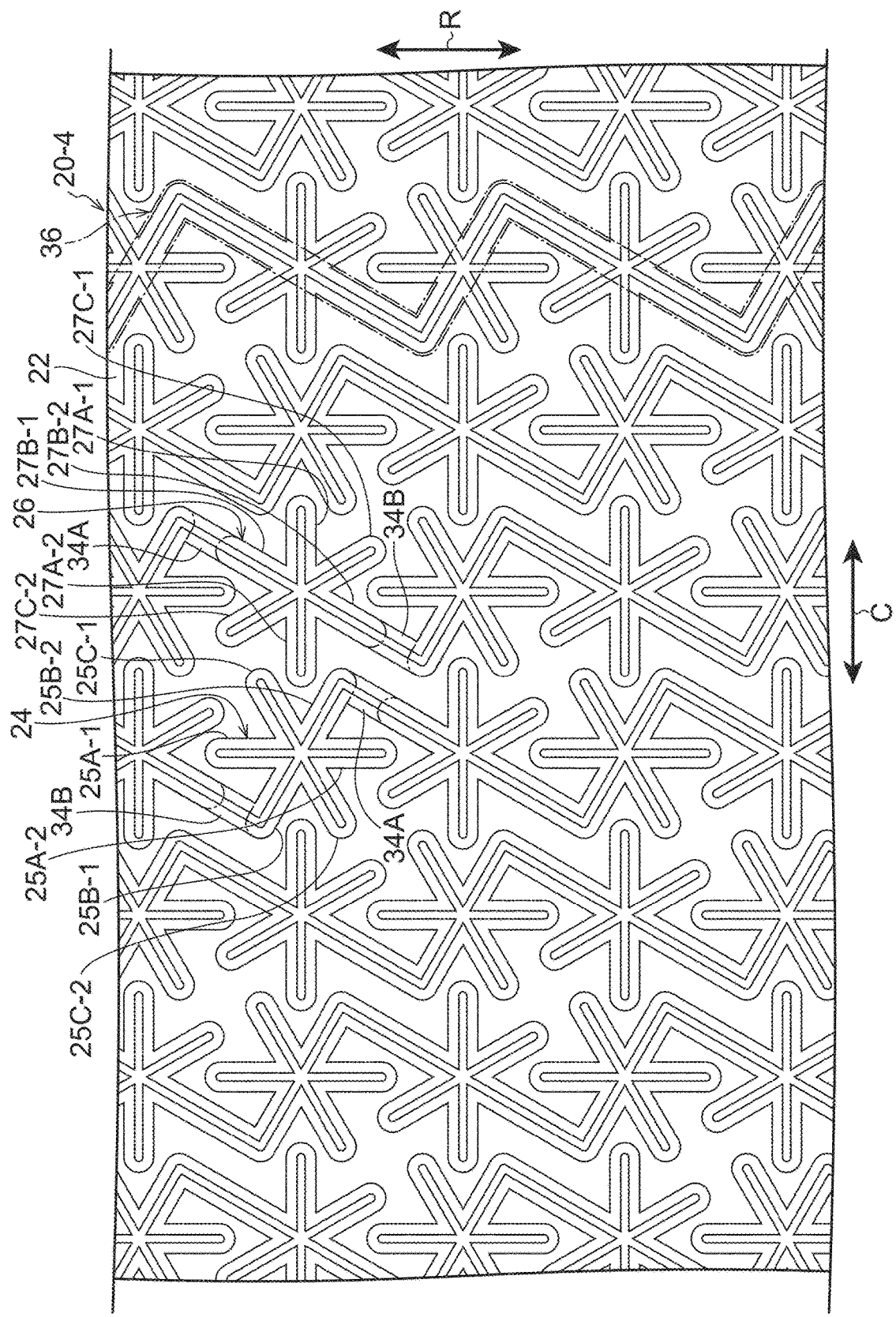
FIG. 12 illustrates a portion of a pattern region of a tire according to a fourth exemplary embodiment.
Figure 13:
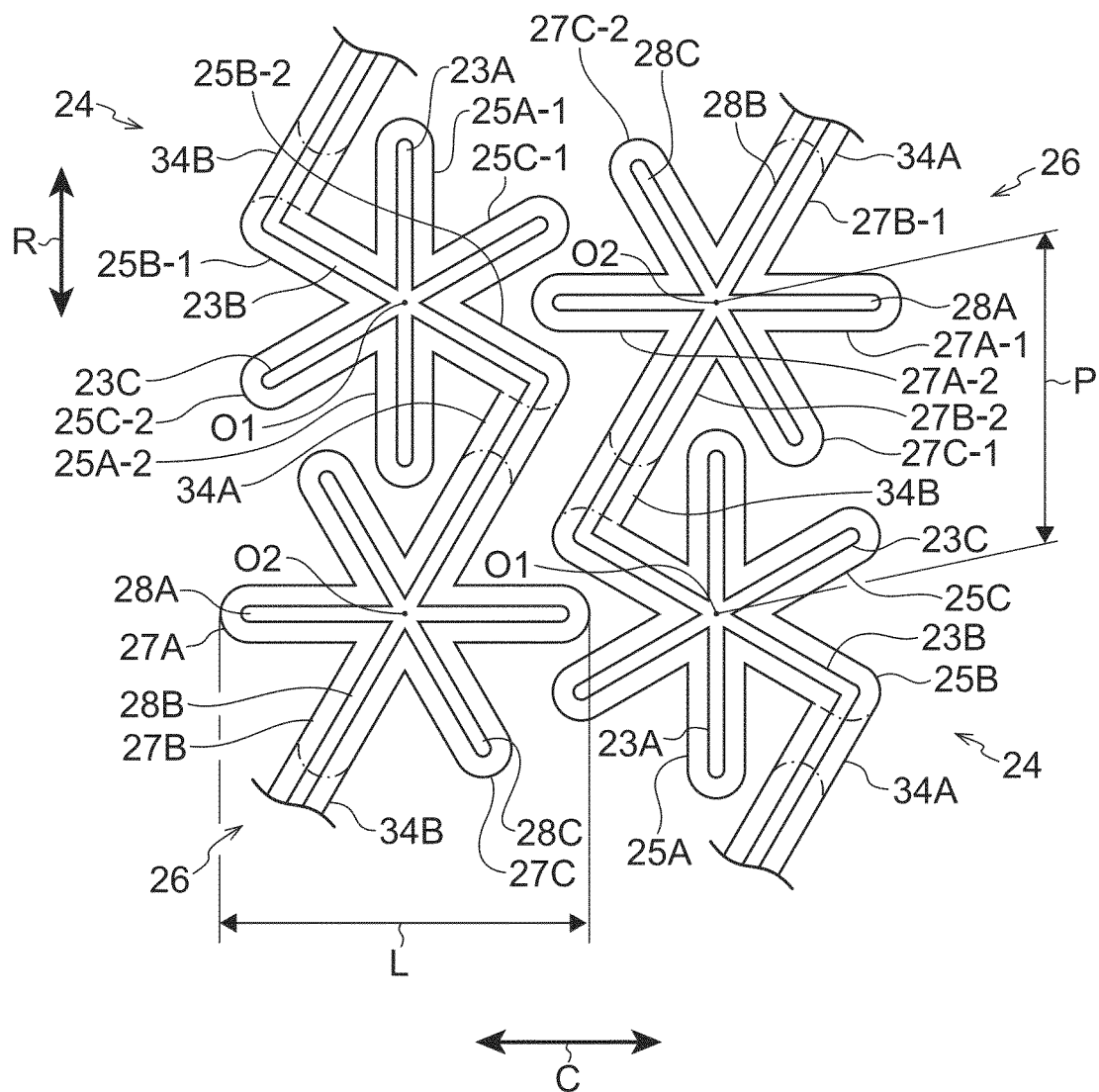
FIG. 13 is an enlarged diagram of a portion of a pattern region of a tire according to the fourth exemplary embodiment.

In a tire 10 of the present exemplary embodiment, the pattern region 20 of the first exemplary embodiment is modified to form a pattern region 20-4. As illustrated in FIG. 12 and FIG. 13, in the pattern region 20-4, connecting portions 34A are formed between the second extension portions 25B-2 and the second extension portions 27B-1. Moreover, connecting portions 34B are formed between the second extension portions 25B-1 and the second extension portions 27B-2. The connecting portions 34A, 34B extend from both leading ends of the second extension portion 27B in the same direction as the second extension portion 27B, and are connected to the respective leading ends of the second extension portions 25B adjacent in the tire radial direction R so as to form 90° angles therewith. In the following explanation, the connecting portions 34A and the connecting portions 34B are referred to collectively as the connecting portions 34.

The connecting portions 34 have the same cross-section profile as the second extension portion 27B. The connecting portions 34, the second extension portion 27B, and the second extension portions 25B are integrally connected together, and the second extension portion 27B and the connecting portion 34 configure a straight line portion that extends for longer than the second extension portion 25B. The second extension portion 27B and the second extension portion 25B are continuous to one another in the tire radial direction R through the connecting portions 34. In the following explanation, a single continuous projection configured by the second extension portions 27B, connecting portions 34, and second extension portions 25B is referred to as a continuous projection 36.

The continuous projection 36 is formed with a zigzagging shape having an amplitude in the tire circumferential direction C, and passing through the centers O1, O2 of the first asterisk projections 24 and the second asterisk projections 26. Overall, the continuous projection 36 extends in the tire radial direction R. The lengths of straight lines passing through the second extension portions 27B of the zigzag are longer than those of the second extension portions 25B. The continuous projection 36 is formed in a continuous zigzagging shape from an inside end to an outside end of the pattern region 20-4 in the tire radial direction R.

In the pattern region 20-4 of the present exemplary embodiment, the first asterisk projections 24 and the second asterisk projections 26 are connected through the connecting portions 34, such that the first asterisk projections 24 and the second asterisk projections 26 support each other through the connecting portions 34. This thereby suppresses the first asterisk projections 24 and the second asterisk projections 26 from tilting inward, and enables durability to be enhanced. Moreover, the second extension portions 25B, 27B are connected together to form the continuous projection 36 that runs continuously from the inside end to the outside end of the pattern region 20-4 in the tire radial direction R, thereby allowing air to escape to the exterior of the pattern region 20-4 through end portions of the continuous projections 36 during vulcanization. This enables cavities caused by trapped air to be suppressed from arising within the pattern region 20-4.

Since the continuous projection 36 extends in a zigzagging shape, the reflection angles in which light is reflected can be made to differ despite the continuity, enabling a concentration of reflected light to be suppressed. This thereby raises the uniformity of the appearance when viewed from different angles, enabling visibility to be enhanced.

Fifth Exemplary Embodiment

Next, explanation follows regarding a fifth exemplary embodiment of the present invention. In the present exemplary embodiment, portions similar to those of the first to the fourth exemplary embodiments are allocated the same reference numerals, and detailed explanation thereof is omitted.

In a tire 10 of the present exemplary embodiment, the pattern region 20 of the first exemplary embodiment is modified to form a pattern region 20-5. The main difference lies in the point that the pattern region 20-5 does not include the connecting portion 34A of the fourth exemplary embodiment, and is instead provided with a connecting portion 38.

Figure 14:
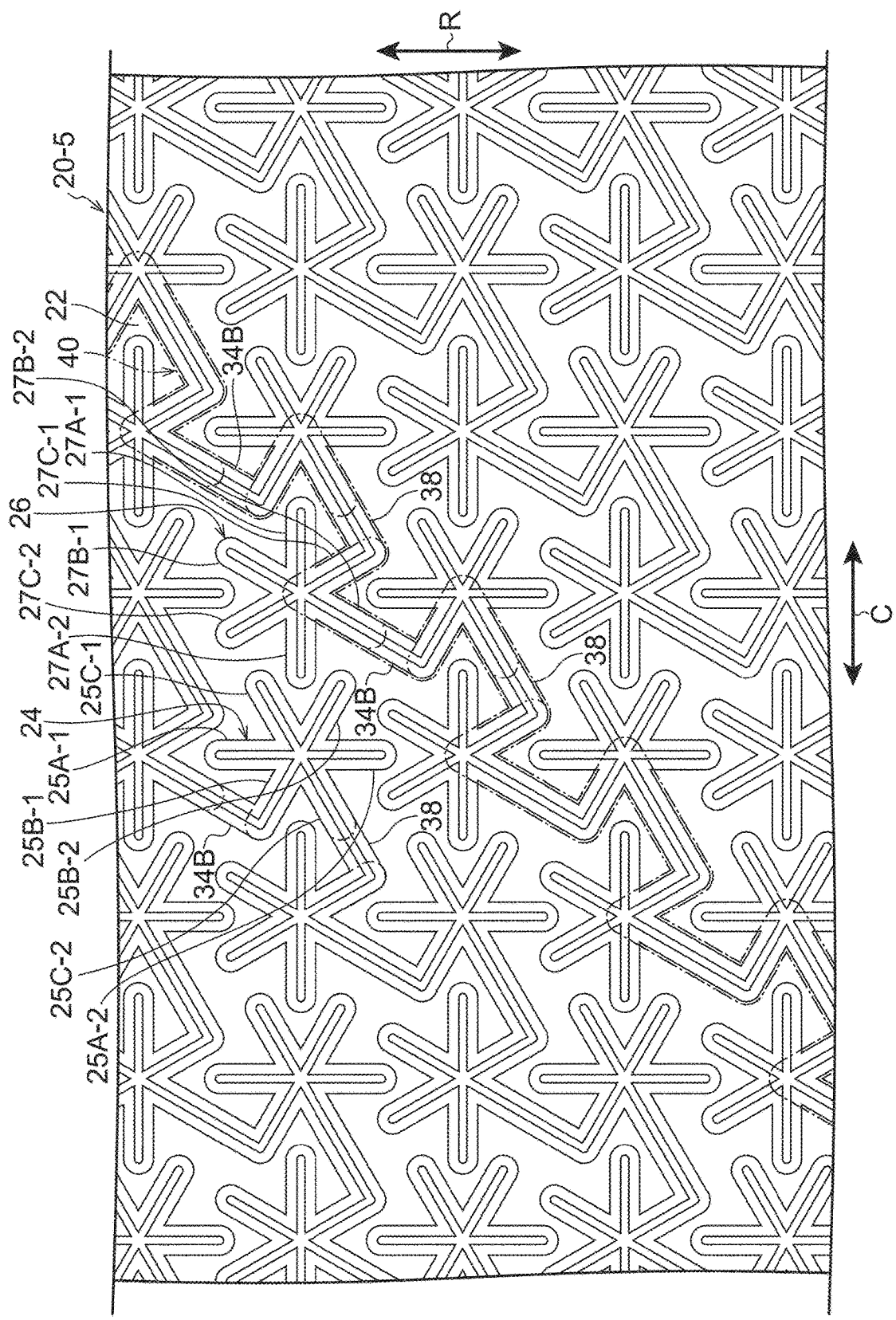
FIG. 14 illustrates a portion of a pattern region of a tire according to a fifth exemplary embodiment.

As illustrated in FIG. 14, in the present exemplary embodiment, connecting portions 34B similar to those of the fourth exemplary embodiment are formed between the second extension portions 25B-1 and the second extension portions 27B-2.

Figure 15:
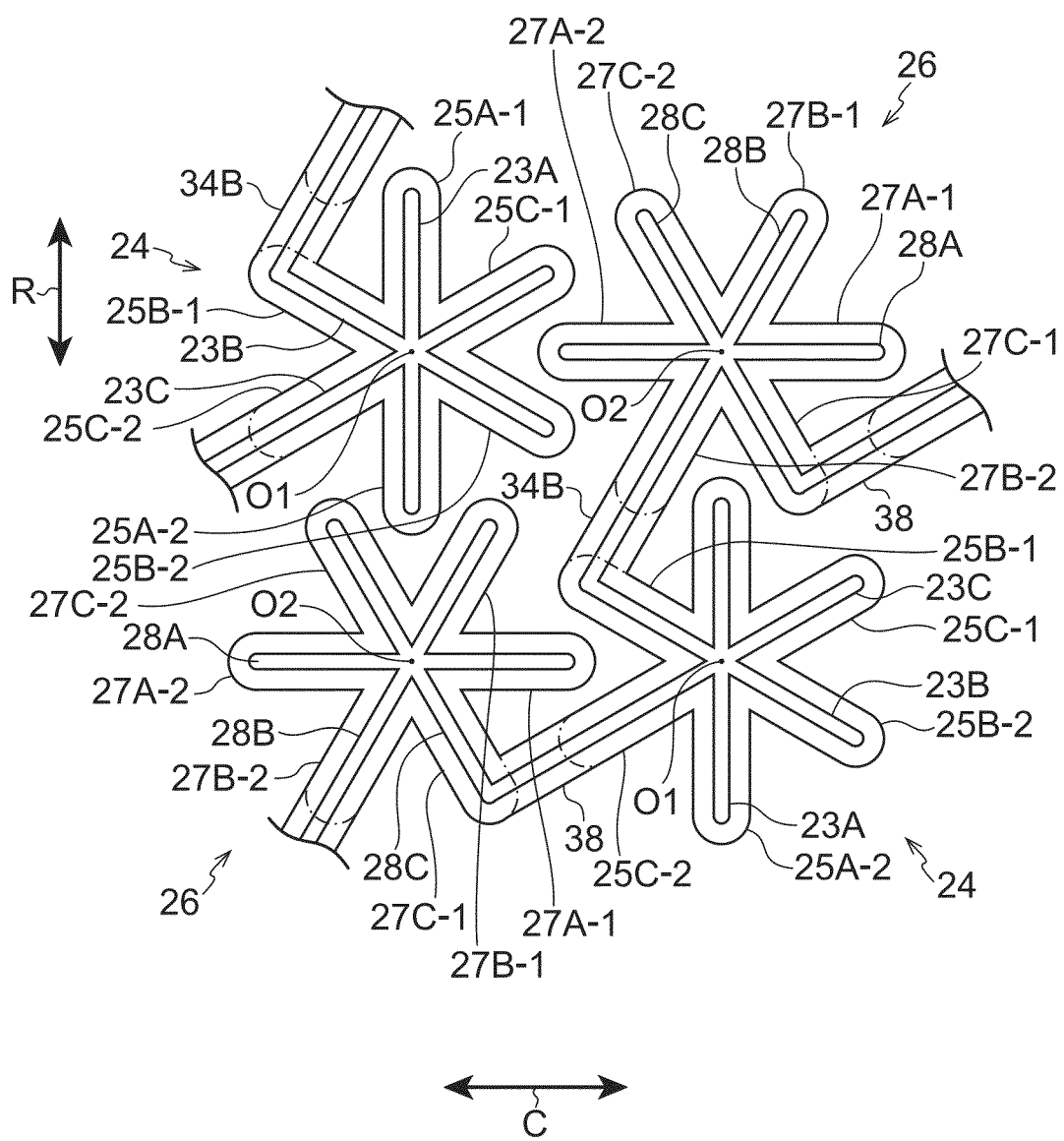
FIG. 15 is an enlarged diagram of a portion of a pattern region of a tire according to the fifth exemplary embodiment.

The connecting portion 38 is formed between the third extension portion 25C-2 and the third extension portion 27C-1. As also illustrated in FIG. 15, the connecting portion 38 extends from the leading end of the third extension portion 25C-2 in the same direction as the third extension portion 25C-2, and is connected to the leading end of the third extension portion 27C-1 adjacent in the tire circumferential direction C so as to form an angle of 90°. The connecting portion 38 has the same cross-section profile as the third extension portion 25C. The connecting portion 38 is integrally connected to the third extension portion 25C-2 and the third extension portion 27C-1. The third extension portion 25C is lengthened by the connecting portion 38 so as to form a straight line portion that is longer than the other extension portions. The connecting portion 34B is integrally connected to the second extension portion 27B-2 and the second extension portion 25B-1. The second extension portion 27B is lengthened by the connecting portion 34B so as to form a straight line portion that is longer than the other extension portions.

The second extension portion 27B-2 and the second extension portion 25B-1 are configured so as to be continuous to each other along the tire radial direction R through the connecting portion 34B. The third extension portion 27C-1 and the third extension portion 25C-2 are configured so as to be continuous to each other along the tire circumferential direction C through the connecting portion 38. Moreover, the second extension portions 27B-2, the connecting portions 34B, the second extension portions 25B-1, the third extension portions 25C-2, the connecting portions 38, and the third extension portions 27C-1 are connected together in this sequence to form a continuous single continuous projection 40. The continuous projection 40 passes through the centers O1, O2 of the first asterisk projections 24 and the second asterisk projections 26, and bends back between adjacent extension portions at each center O1, O2 to extend toward other first asterisk projections 24 and second asterisk projections 26. Overall, the continuous projection 40 extends at an angle inclined with respect to the tire radial direction R. The continuous projection 40 is formed continuously from an inside end to an outside end of the pattern region 20-5 in the tire radial direction R.

In the pattern region 20-5 of the present exemplary embodiment, adjacent first asterisk projections 24 and second asterisk projections 26 are connected together by the connecting portions 34B and the connecting portions 38 that extend in different directions to each other. This thereby enables light to be reflected in different directions by the connecting portions, thus raising the uniformity of the appearance when viewed from different angles, and thereby enabling visibility to be enhanced. Similar advantageous effects to those of the fourth exemplary embodiment can also be obtained.

Figure 16:
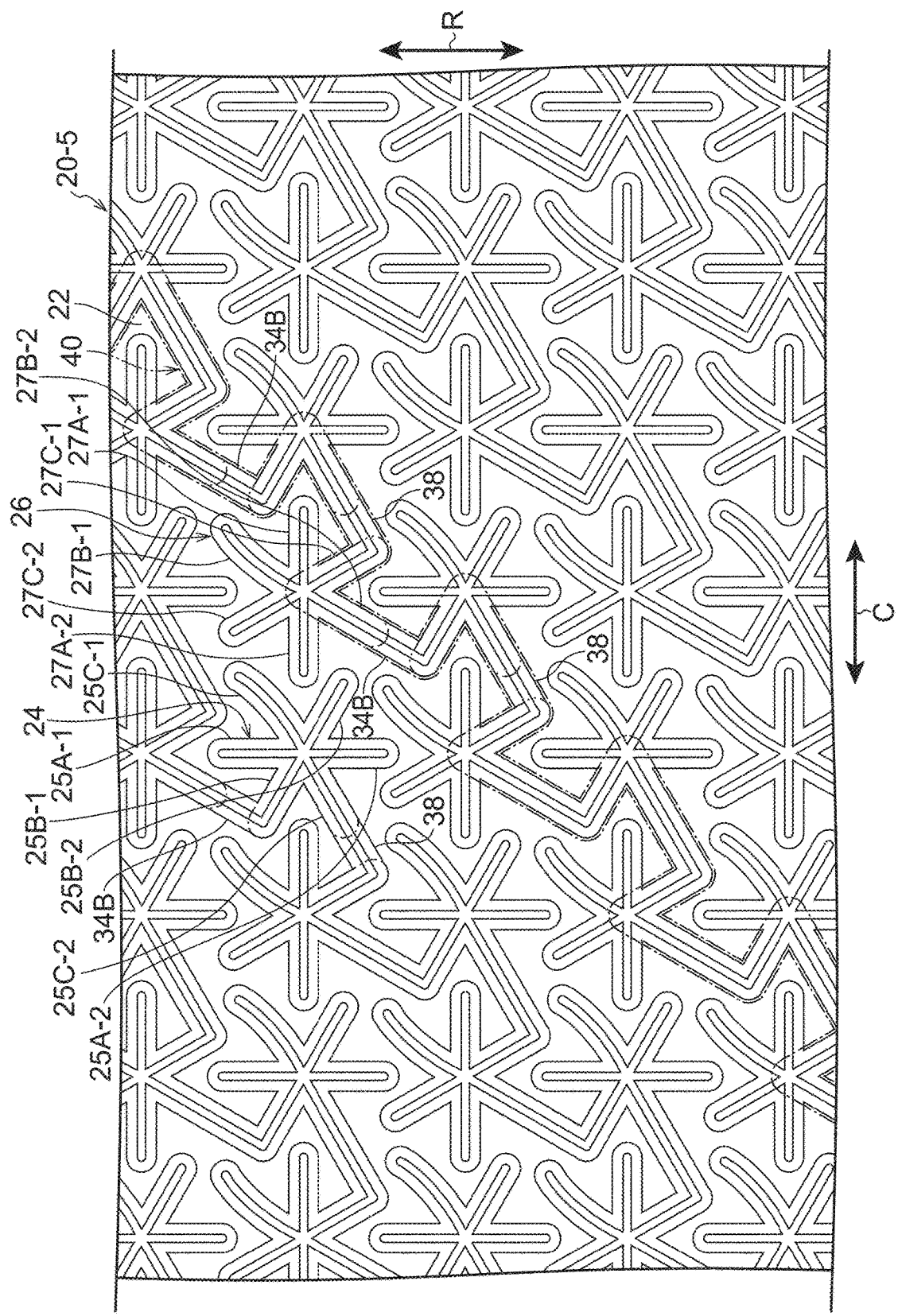
FIG. 16 illustrates a portion of a pattern region of a tire according to a modified example of the fifth exemplary embodiment.
Figure 17:
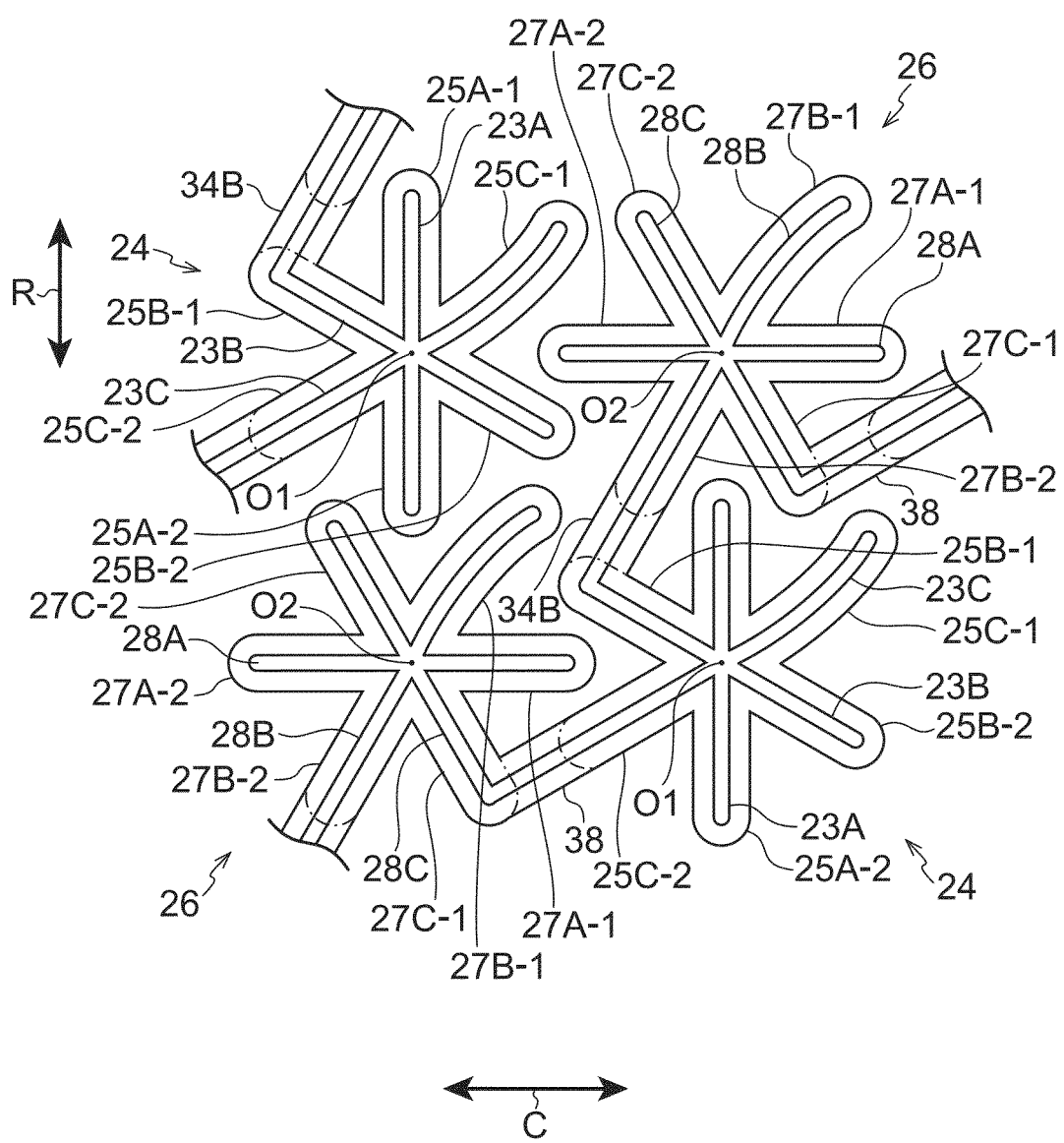
FIG. 17 is an enlarged diagram of a portion of a pattern region of a tire according to a modified example of the fifth exemplary embodiment.

Note that as illustrated in FIG. 16 and FIG. 17, the third extension portion 25C-1 and the second extension portion 27B-1 of the first asterisk projection 24 and the second asterisk projection 26 of the present exemplary embodiment may each be configured with a curving shape. The third extension portion 25C-1 is curved such that its leading end approaches the connecting portion 38, and the second extension portion 27B-1 is curved such that its leading end approaches the connecting portion 34B. By configuring the third extension portion 25C-1 and the second extension portion 27B-1 with curving shapes in this manner, a concentration of reflected light reflected by the third extension portion 25C-1 and the second extension portion 27B-1 is suppressed. This thereby raises the uniformity of the appearance when viewed from different angles, enabling visibility to be enhanced. Moreover, the bottom face of the base 22 becomes difficult to see due to the curved extension portions, enabling reflection of light incident to the pattern region 20-5 to be suppressed.

Sixth Exemplary Embodiment

Next, explanation follows regarding a sixth exemplary embodiment of the present invention. In the present exemplary embodiment, portions similar to those of the first to the fifth exemplary embodiments are allocated the same reference numerals, and detailed explanation thereof is omitted.

In a tire 10 of the present exemplary embodiment, the pattern region 20 of the first exemplary embodiment is modified to form a pattern region 20-6. The main difference in the pattern region 20-6 is to the connecting portions 34 of the fourth exemplary embodiment.

Figure 18:
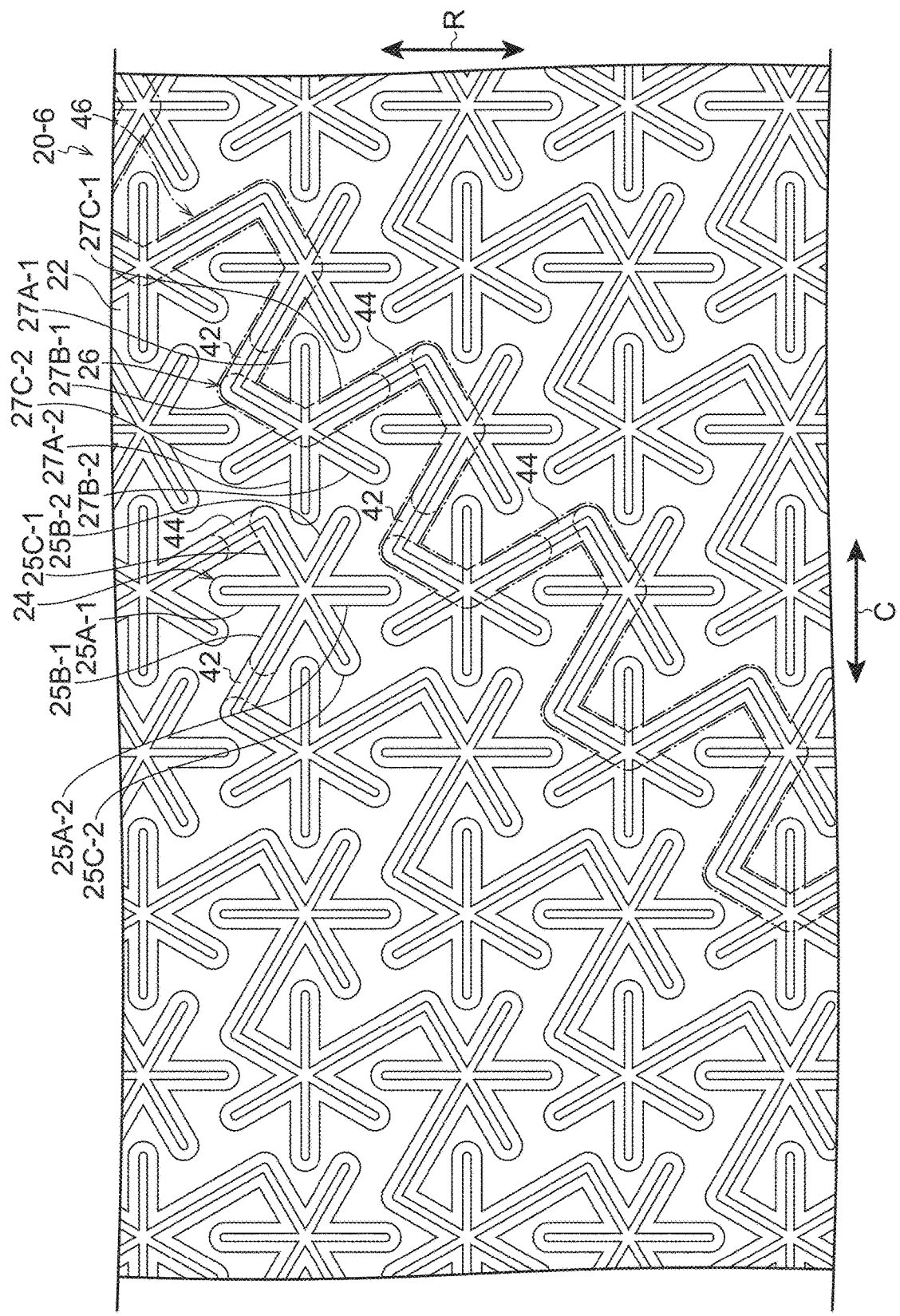
FIG. 18 illustrates a portion of a pattern region of a tire according to a sixth exemplary embodiment.
Figure 19:
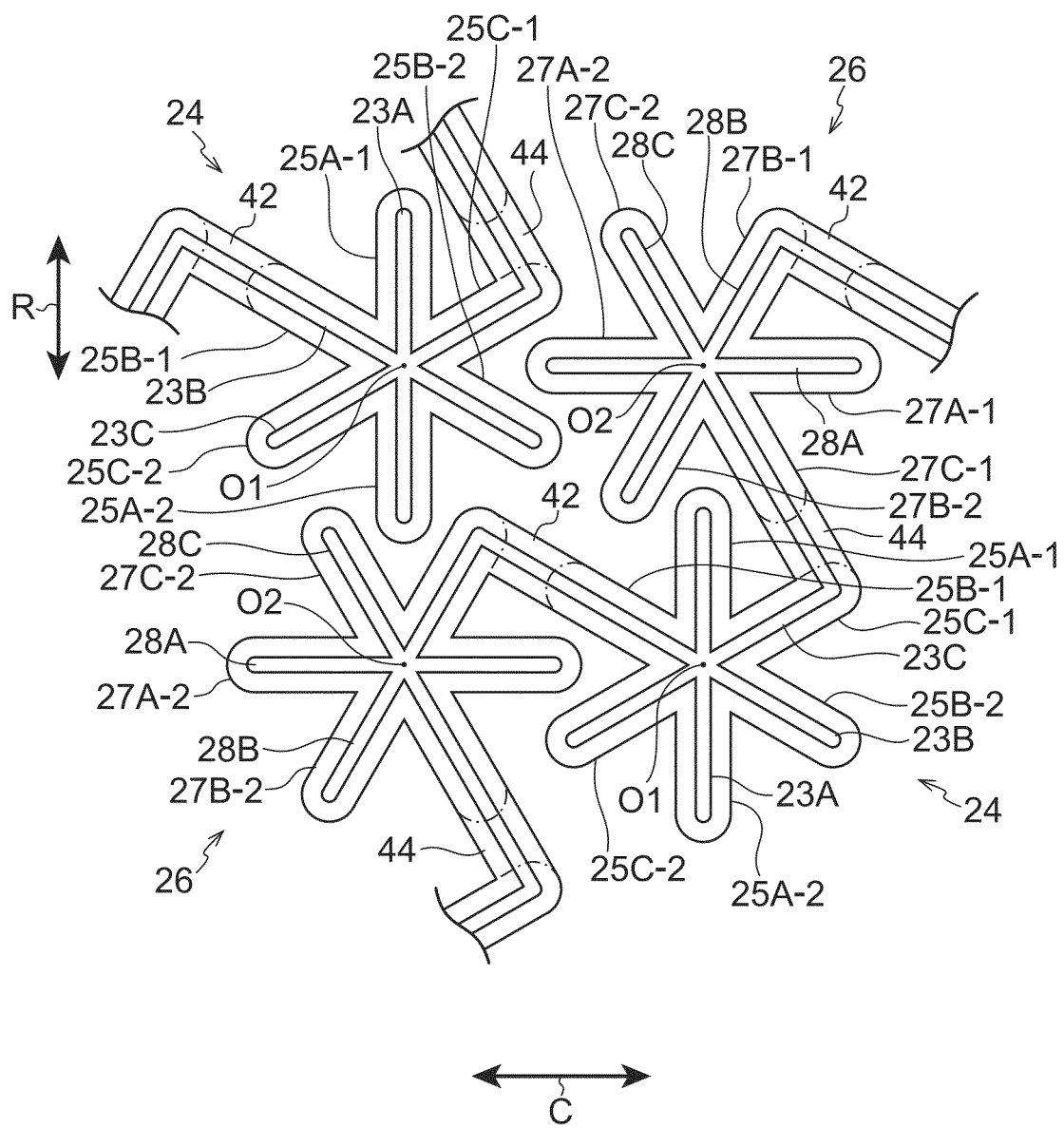
FIG. 19 is an enlarged diagram of a portion of a pattern region of a tire according to the sixth exemplary embodiment.

In the present exemplary embodiment, as illustrated in FIG. 18 and FIG. 19, a connecting portion 42 is formed between the second extension portion 25B-1 and the second extension portion 27B-1. The connecting portion 42 extends from the leading end of the second extension portion 25B-1 in the same direction as the second extension portion 25B-1, and is connected to the leading end of the second extension portion 27B-1 adjacent in the tire circumferential direction C so as to form an angle of 90°. The connecting portion 42 has the same cross-section profile as the second extension portion 25B-1. The second extension portion 27B-1 and the second extension portion 25B-1 are continuous in the tire circumferential direction C through the connecting portion 42. The connecting portion 42 is integrally connected to the second extension portion 25B-1 and the second extension portion 27B-1. The second extension portion 25B-1 is lengthened by the connecting portion 42 to form a straight line portion that is longer than the other extension portions.

A connecting portion 44 is formed between the third extension portion 25C-1 and the third extension portion 27C-1. The connecting portion 44 extends from the leading end of the third extension portion 27C-1 in the same direction as the third extension portion 27C-1, and is connected to the leading end of the third extension portion 25C-1 adjacent in the tire radial direction R so as to form an angle of 90°. The connecting portion 44 has the same cross-section profile as the third extension portion 27C-1. The third extension portion 27C-1 and the third extension portion 25C-1 are continuous in the tire radial direction R through the connecting portion 44. The connecting portion 44 is integrally connected to the third extension portion 27C-1 and the third extension portion 25C-1. The third extension portion 27C-1 is lengthened by the connecting portion 44 to form a straight line portion that is longer than the other extension portions.

The second extension portion 25B-1 and the second extension portion 27B-1 are continuous to each other in the tire circumferential direction C through the connecting portion 42. The third extension portion 27C-1 and the third extension portion 25C-1 are continuous to each other in the tire radial direction R through the connecting portion 44. Moreover, the third extension portions 27C-1, the connecting portions 44, the third extension portions 25C-1, the second extension portions 25B-1, the connecting portions 42, and the second extension portions 27B-1 are connected together in this sequence to form a continuous single continuous projection 46. The continuous projection 46 passes through the centers O1, O2 of the first asterisk projections 24 and the second asterisk projections 26, and bends between non-adjacent extension portions at the centers O1, O2 so as to extend toward other first asterisk projections 24 and second asterisk projections 26. Overall, the continuous projection 46 extends at an angle inclined with respect to the tire radial direction R. The continuous projection 46 is formed continuously from an inside end to an outside end of the pattern region 20-6 in the tire radial direction R.

In the pattern region 20-6 of the present exemplary embodiment, adjacent first asterisk projections 24 and second asterisk projections 26 are connected together through the connecting portions 42 and the connecting portions 44 that extend in different directions to each other. This thereby enables light to be reflected in different directions by the connecting portions, thus raising the uniformity of the appearance when viewed from different angles, and thereby enabling visibility to be enhanced. Similar advantageous effects to those of the third exemplary embodiment can also be obtained.

Figure 20:
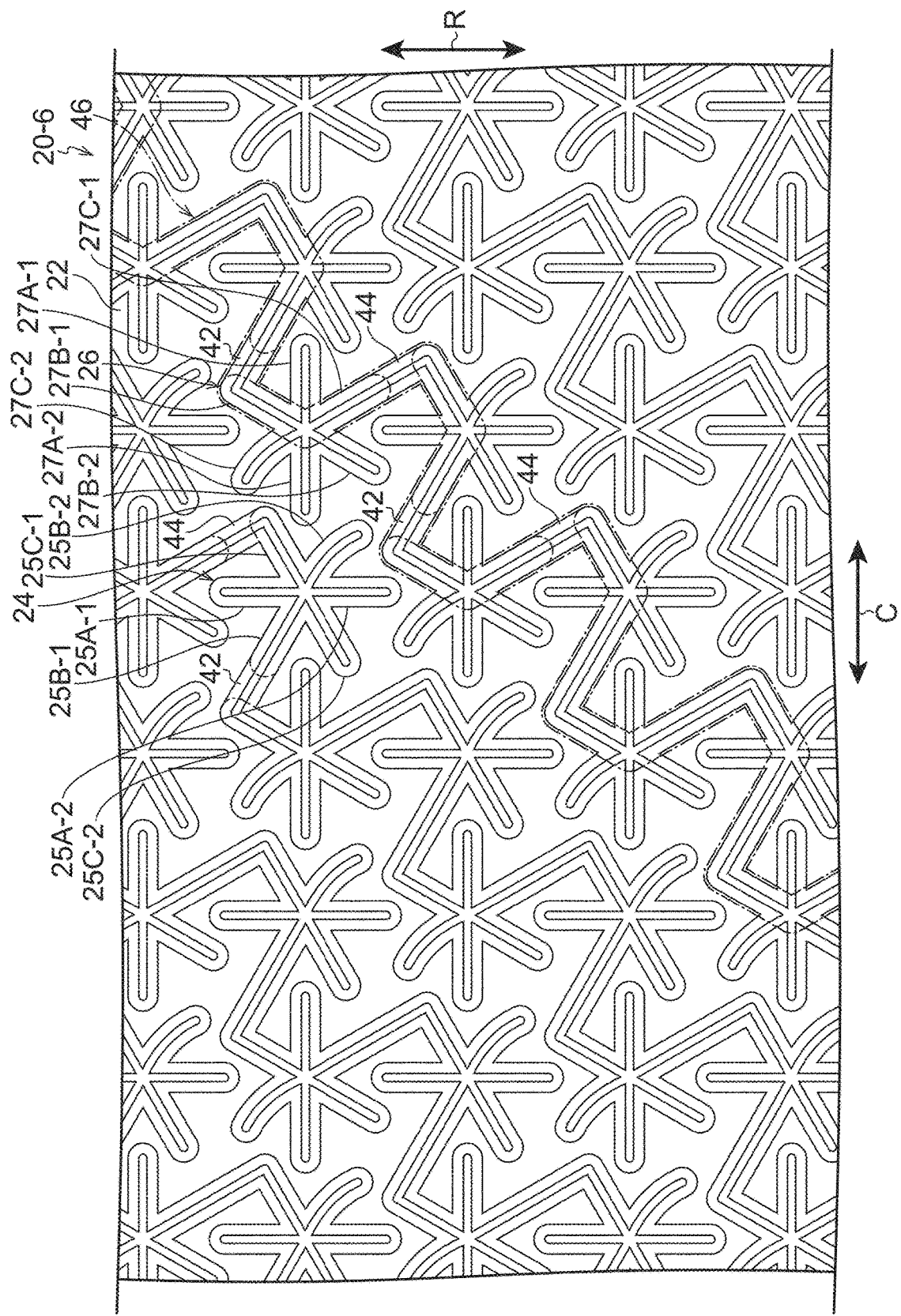
FIG. 20 illustrates a portion of a pattern region of a tire according to a modified example of the sixth exemplary embodiment.
Figure 21:
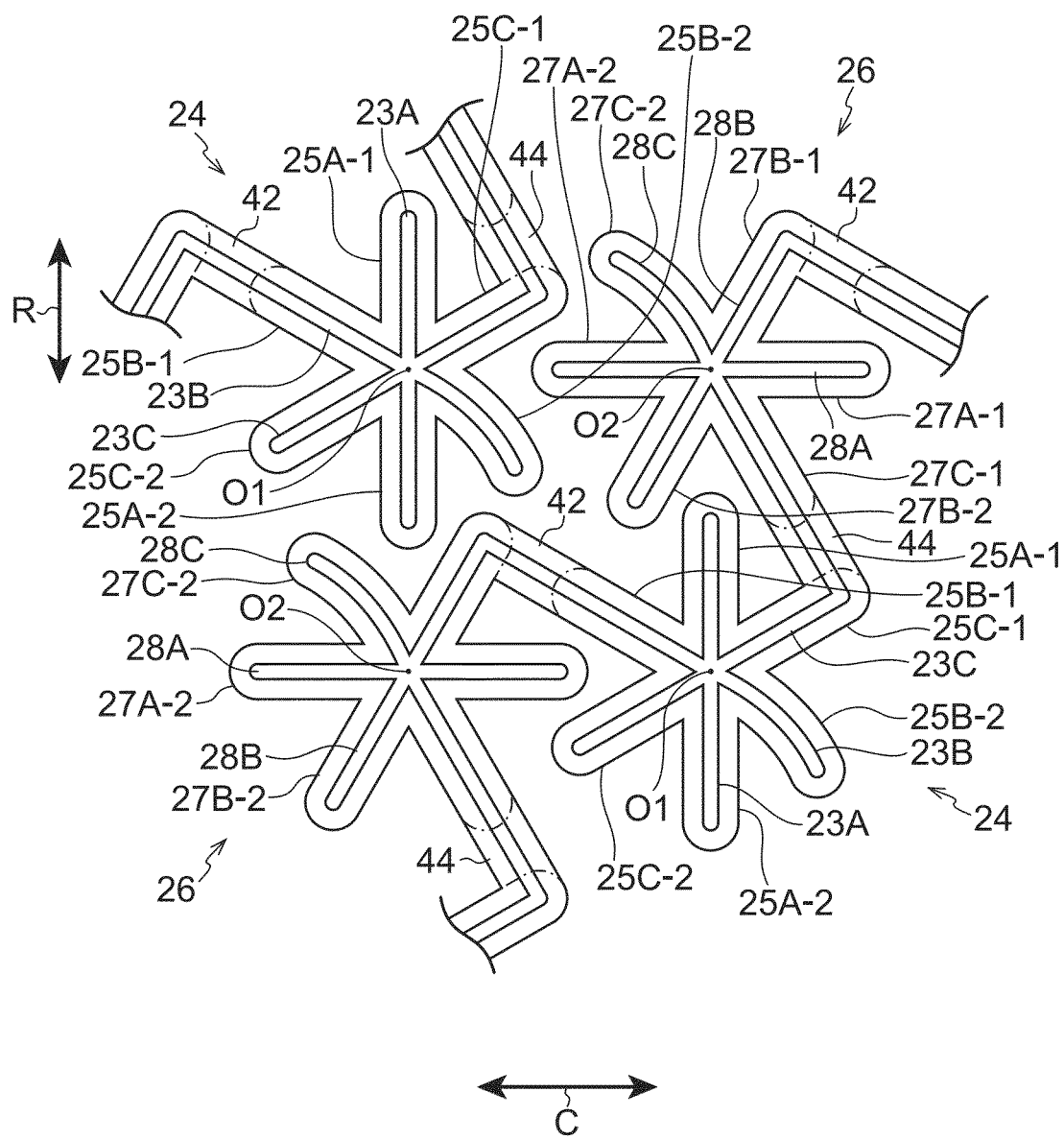
FIG. 21 is an enlarged diagram of a portion of a pattern region of a tire according to a modified example of the sixth exemplary embodiment.

Note that as illustrated in FIG. 20 and FIG. 21, the second extension portion 25B-2 and the third extension portion 27C-2 of the first asterisk projection 24 and the second asterisk projection 26 of the present exemplary embodiment may each be configured with a curving shape. The second extension portion 25B-2 is curved such that its leading end approaches the second extension portion 27B-1, and the third extension portion 27C-2 is curved such that its leading end approaches the third extension portion 25C-1. By configuring the second extension portion 25B-2 and the third extension portion 27C-2 with curving shapes in this manner, a concentration of reflected light reflected by the second extension portion 25B-2 and the third extension portion 27C-2 is suppressed. This thereby raises the uniformity of the appearance when viewed from different angles, enabling visibility to be enhanced. Moreover, the bottom face of the base 22 becomes difficult to see due to the curved extension portions, enabling reflection of light incident to the pattern region 20-6 to be suppressed.

Figure 22:
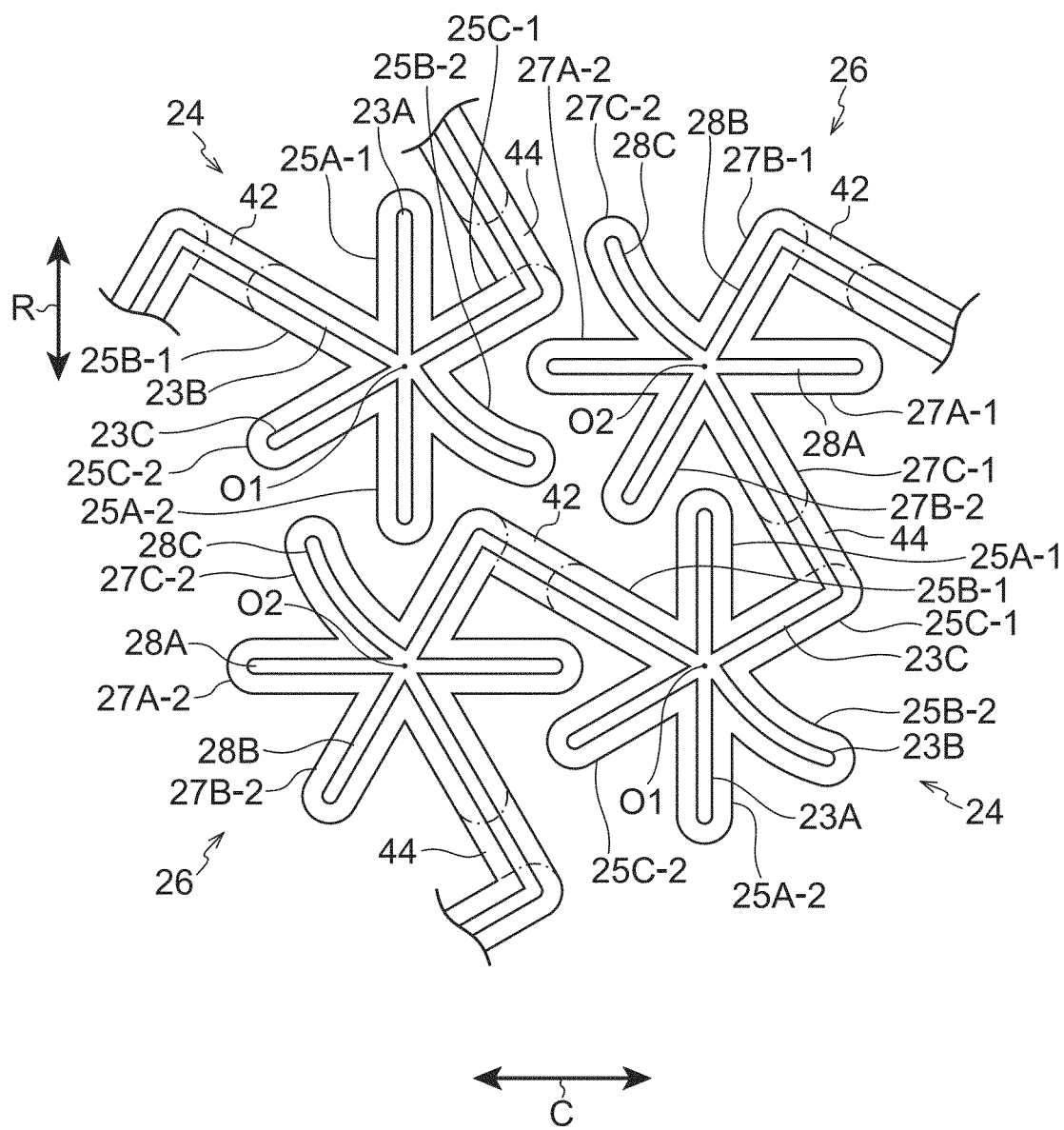
FIG. 22 is an enlarged diagram of a portion of a pattern region of a tire according to another modified example of the sixth exemplary embodiment.

Note that as illustrated in FIG. 22, the directions in which the second extension portion 25B-2 and the third extension portion 27C-2 curve may be the opposite directions to the directions illustrated in FIG. 21.

Seventh Exemplary Embodiment

Next, explanation follows regarding a sixth exemplary embodiment of the present invention. In the present exemplary embodiment, portions similar to those of the first to the sixth exemplary embodiments are allocated the same reference numerals, and detailed explanation thereof is omitted.

In a tire 10 of the present exemplary embodiment, the pattern region 20 of the first exemplary embodiment is modified to form a pattern region 20-7. The main difference in the pattern region 20-7 lies in the point that the connecting portion 42 of the fifth exemplary embodiment is provided instead of the connecting portion 34A of the fourth exemplary embodiment.

Figure 23:
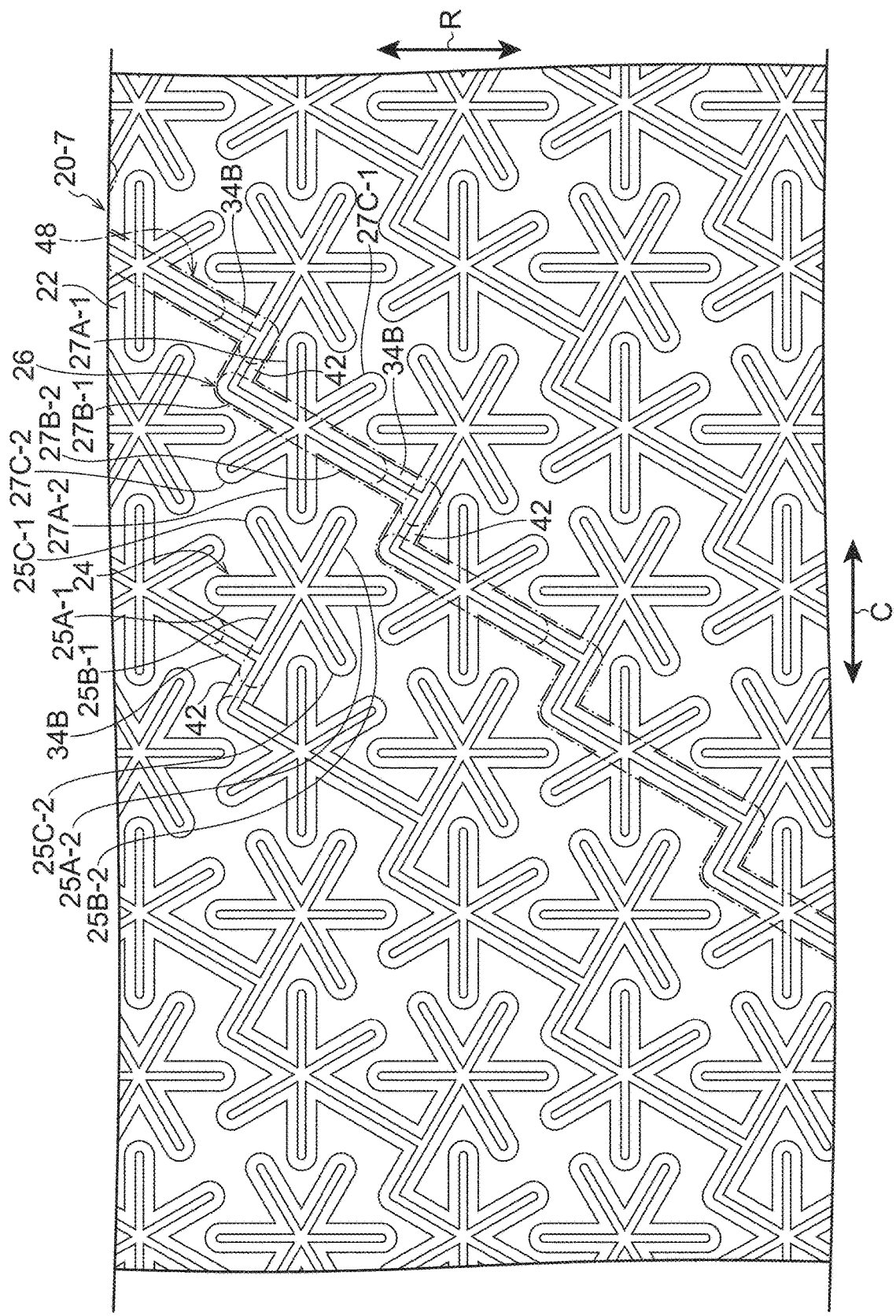
FIG. 23 illustrates a portion of a pattern region of a tire according to a seventh exemplary embodiment.
Figure 24:
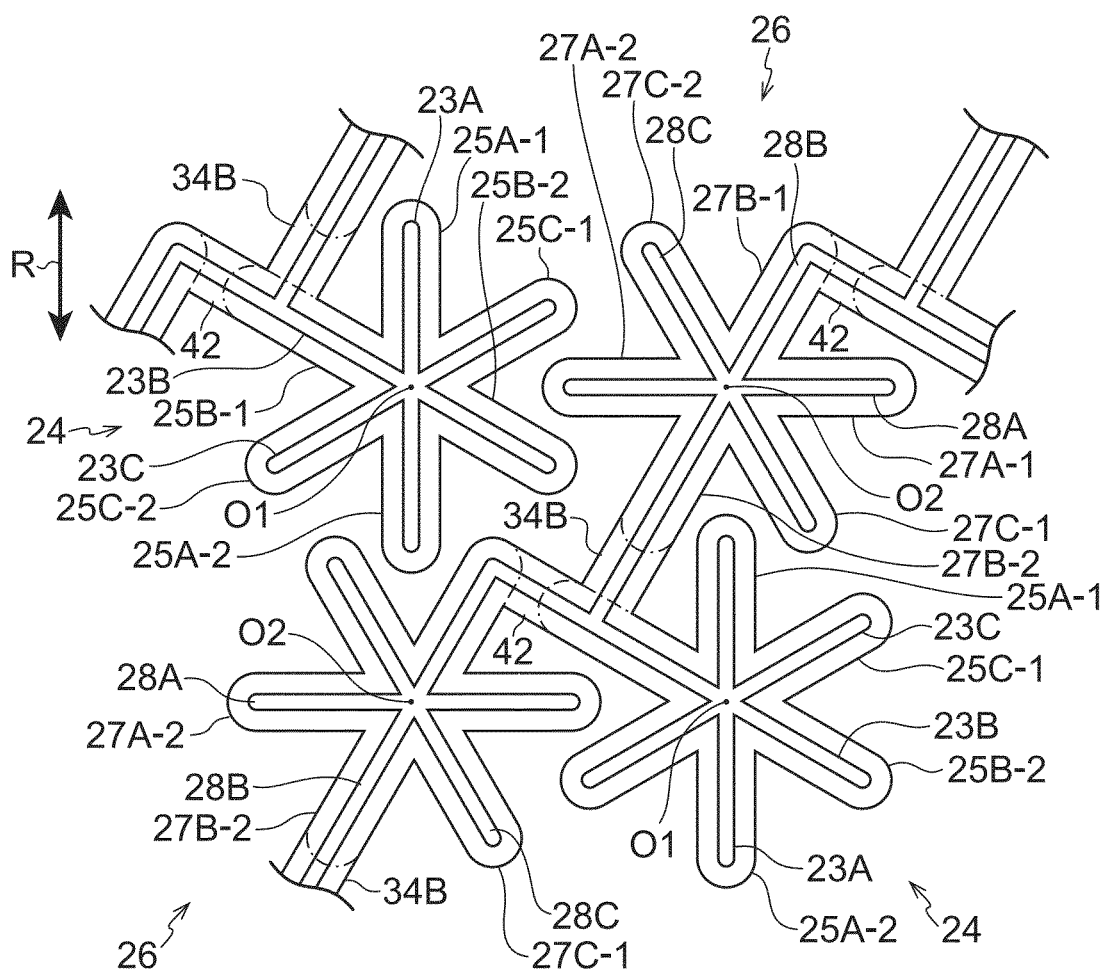
FIG. 24 is an enlarged diagram of a portion of a pattern region of a tire according to the seventh exemplary embodiment.

In the present exemplary embodiment, as illustrated in FIG. 23 and FIG. 24, the connecting portion 42 is formed between the second extension portion 25B-1 and the second extension portion 27B-1. The connecting portion 42 extends from the leading end of the second extension portion 25B-1 in the same direction as the second extension portion 25B-1, and is connected to the leading end of the second extension portion 27B-1 adjacent in the tire circumferential direction C so as to form an angle of 90°. The connecting portion 42 is integrally connected to the second extension portion 25B-1 and the second extension portion 27B-1. The second extension portion 25B-1 is lengthened by the connecting portion 42 to form a straight line portion that is longer than the other extension portions.

The connecting portion 34B is formed between the tire radial direction R outside of the second extension portion 25B-1 and the leading end of the second extension portion 27B-2. The connecting portion 34B extends from the leading end of the second extension portion 27B-2 in the same direction as the second extension portion 27B-2, and is connected to the tire radial direction R outside of the second extension portion 25B-1 adjacent in the tire radial direction R so as to form an angle of 90°. The connecting portion 34B is integrally connected to the second extension portion 25B-1 and the second extension portion 27B-2. The second extension portion 27B-2 is lengthened by the connecting portion 34B to form a straight line portion that is longer than the other extension portions.

The second extension portion 25B and the second extension portion 27B are continuous to each other in the tire circumferential direction C and in the tire radial direction R through the connecting portions 34B, 42. Moreover, the second extension portions 27B, the connecting portions 34B, the second extension portions 25B-1, and the connecting portions 42 are connected together in this sequence to form a continuous single continuous projection 48. In other words, the continuous projection 48 passes through the center O2 of the second asterisk projection 26, and adjacent second asterisk projections 26 in a direction inclined with respect to the tire radial direction R are configured together through one end portion of the first asterisk projection 24 and the connecting portions 42, 34B. Overall, the continuous projection 48 extends at an angle inclined with respect to the tire radial direction R. The continuous projection 48 is formed in a continuous zigzagging shape from an inner end to an outer end of the pattern region 20-7 in the tire radial direction R.

In the pattern region 20-7 of the present exemplary embodiment, adjacent first asterisk projections 24 and second asterisk projections 26 are connected together by the connecting portion 34B and the connecting portion 42 that extend in different directions to each other, thereby enabling the direction of light reflected by the connecting portions to be varied. This thereby raises the uniformity of the appearance when viewed from different angles, enabling visibility to be enhanced. Similar advantageous effects to those of the fourth exemplary embodiment can also be obtained.

Figure 25:
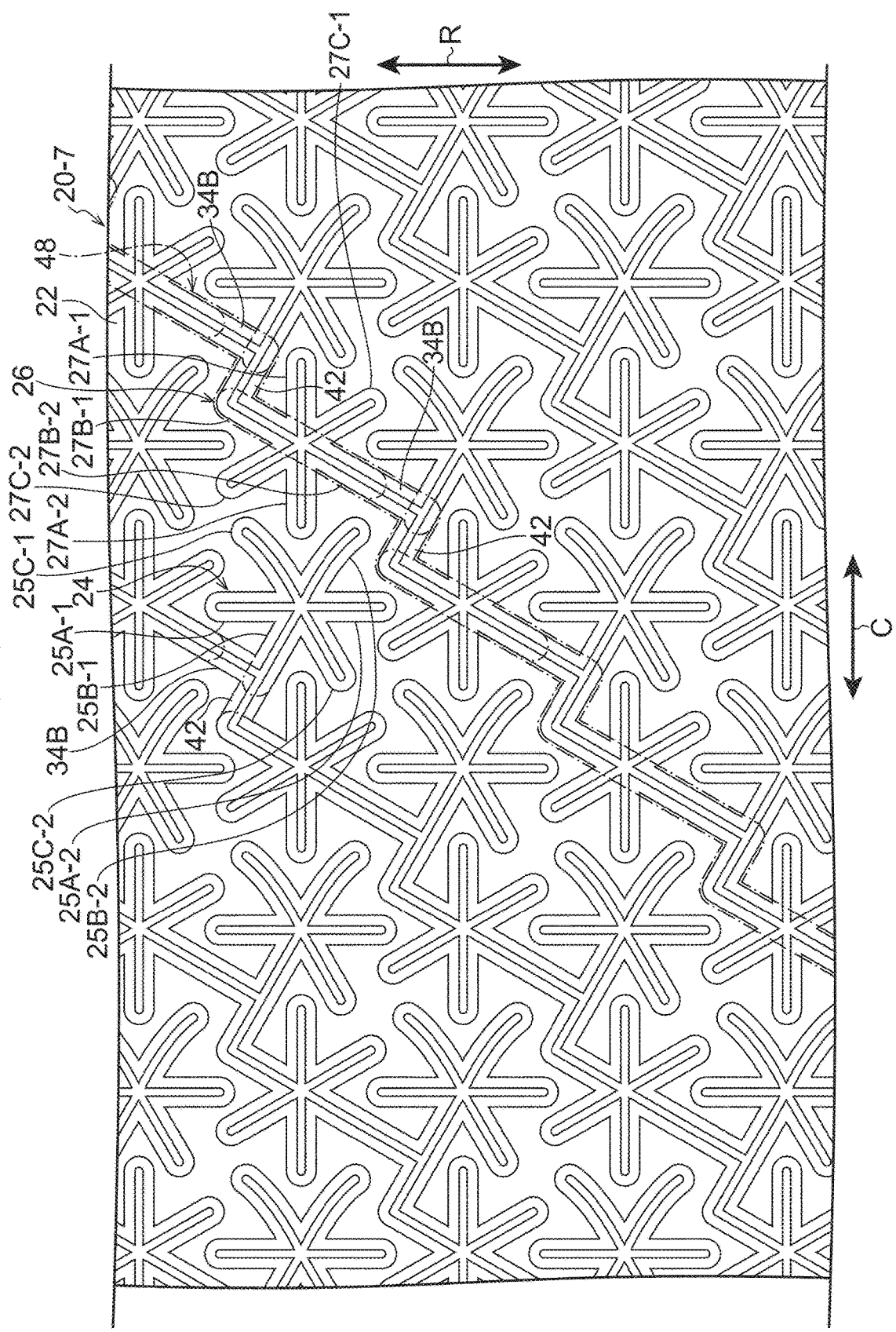
FIG. 25 illustrates a portion of a pattern region of a tire according to a modified example of the seventh exemplary embodiment.

Note that as illustrated in FIG. 25, the second extension portion 25B-2 and the third extension portion 25C-1 of the first asterisk projection 24 of the present exemplary embodiment may each be configured with a curving shape. The second extension portion 25B-2 is curved such that its leading end approaches the connecting portion 42, and the third extension portion 25C-1 is curved such that its leading end approaches the leading end of the third extension portion 27C-1. By configuring the second extension portion 25B-2 and the third extension portion 25C-1 with curving shapes in this manner, a concentration of reflected light reflected by the second extension portion 25B-2 and the third extension portion 25C-1 is suppressed. This thereby raises the uniformity of the appearance when viewed from different angles, enabling visibility to be enhanced. Moreover, the bottom face of the base 22 becomes difficult to see due to the curved extension portions, enabling reflection of light incident to the pattern region 20-7 to be suppressed.

Eighth Exemplary Embodiment

Next, explanation follows regarding a seventh exemplary embodiment of the present invention. In the present exemplary embodiment, portions similar to those of the first to the seventh exemplary embodiments are allocated the same reference numerals, and detailed explanation thereof is omitted.

In a tire 10 of the present exemplary embodiment, the pattern region 20 of the first exemplary embodiment is modified to form a pattern region 20-8. The main difference in the pattern region 20-8 lies in the point that connecting portions 52, 54 are formed instead of the connecting portion 34 of the fourth exemplary embodiment.

Figure 26:
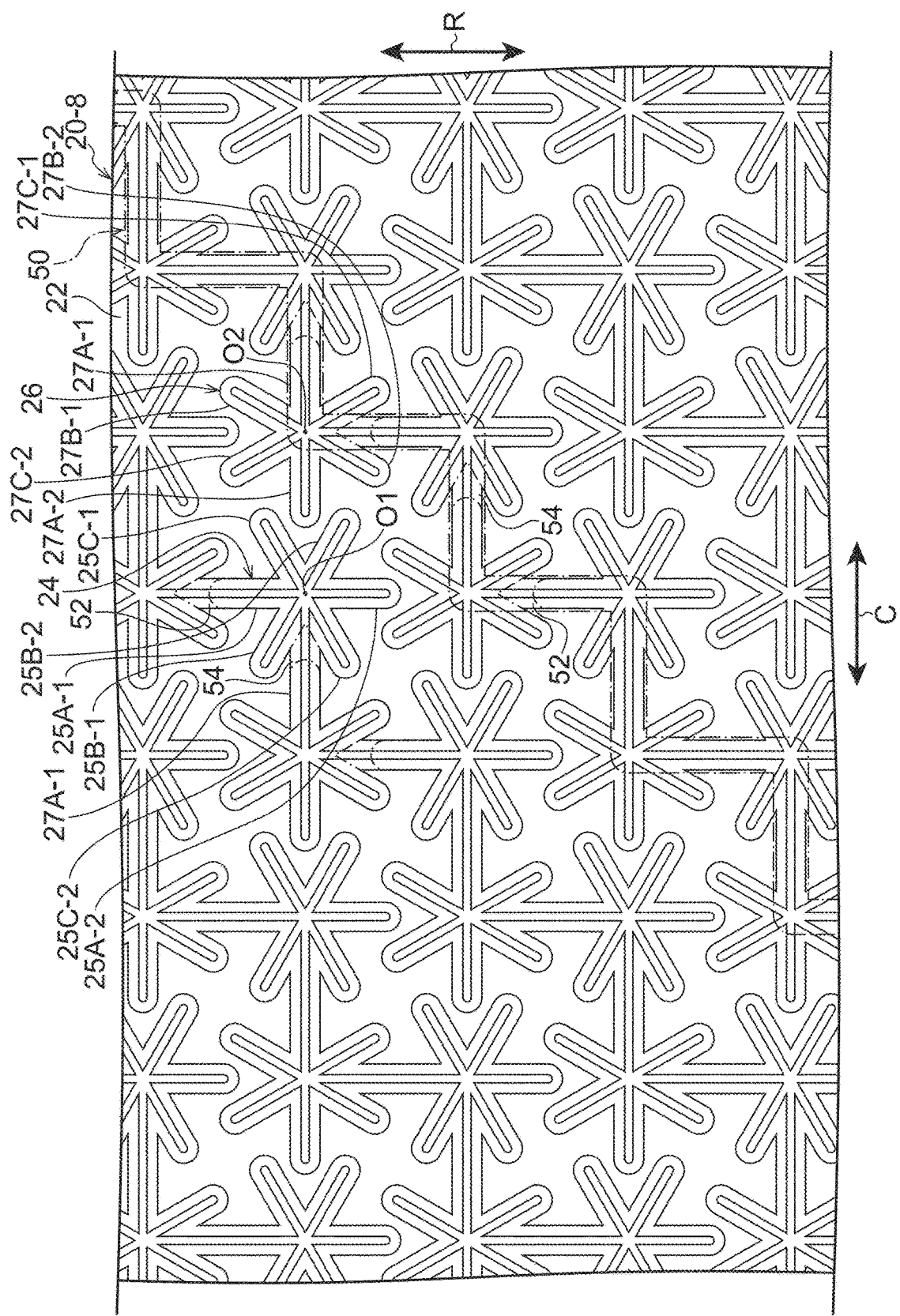
FIG. 26 illustrates a portion of a pattern region of a tire according to an eighth exemplary embodiment.
Figure 27:
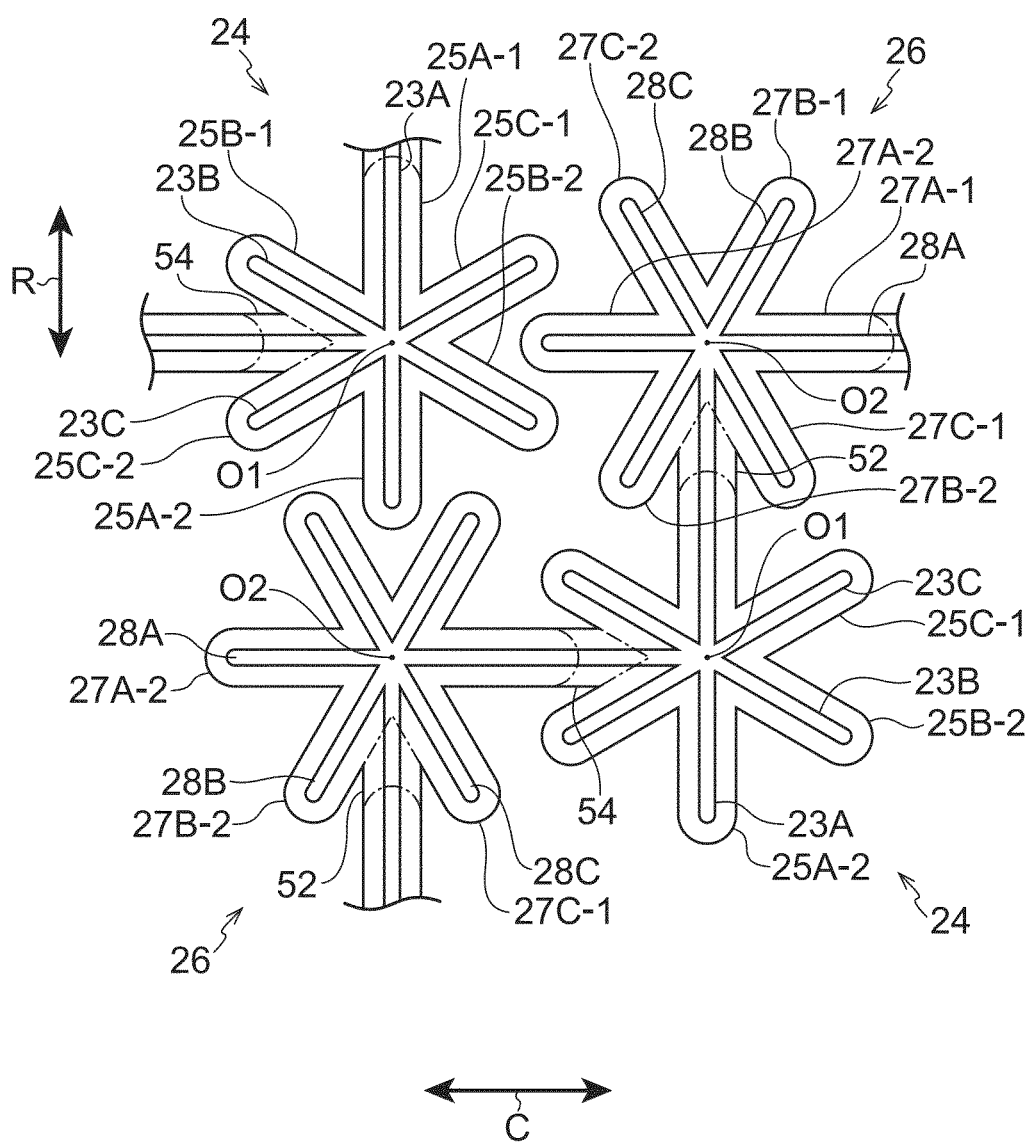
FIG. 27 is an enlarged diagram of a portion of a pattern region of a tire according to the eighth exemplary embodiment.

As illustrated in FIG. 26 and FIG. 27, the pattern region 20-8 of the present exemplary embodiment includes the connecting portion 52 formed between the leading end of the first extension portion 25A-1 and the center O2 of the second asterisk projection 26, and the connecting portion 54 formed between the leading end of the first extension portion 27A-1 and the center O1 of the first asterisk projection 24.

The connecting portion 52 extends from a leading side of the first extension portion 25A-1 toward the center O2 of the second asterisk projection 26, and is connected between the second extension portion 27B-2 and the third extension portion 27C-1. The cross-section profile of the connecting portion 52 is similar to that of the first extension portion 25A-1. The connecting portion 52 is integrally connected to the first extension portion 25A-1, the second extension portion 27B-2, and the third extension portion 27C-1. The first extension portion 25A-1 is lengthened by the connecting portion 52 to form a straight line portion that is longer than the other extension portions. The first extension portion 25A-1 and the second asterisk projection 26 are continuous to each other in the tire radial direction R through the connecting portion 52.

The connecting portion 54 extends from the leading end of the first extension portion 27A-1 toward the center O1 of the first asterisk projection 24, and is connected between the second extension portion 25B-1 and the third extension portion 25C-2. The cross-section profile of the connecting portion 54 is similar to that of the first extension portion 27A-1. The connecting portion 54 is integrally connected to the first extension portion 27A-1, the second extension portion 25B-1, and the third extension portion 25C-2. The first extension portion 27A-1 is lengthened by the connecting portion 54 to form a straight line portion that is longer than the other extension portions. The first extension portion 27A-1 and the first asterisk projection 24 are continuous to each other in the tire circumferential direction C through the connecting portion 54.

In the first asterisk projections 24 and the second asterisk projections 26, the first extension portions 27A-1, the connecting portions 52, the first extension portions 25A-1, and the connecting portions 54 are connected together in this sequence to form a continuous single continuous projection 50. The continuous projection 50 passes through the centers O1, O2 of the first asterisk projections 24 and the second asterisk projections 26 and extends around 90° bends at the centers O1, O2 so as to connect to the adjacent first asterisk projection 24 or second asterisk projection 26. Overall, the continuous projection 50 extends in a zigzagging shape at an angle inclined with respect to the tire radial direction R. The continuous projection 50 is formed continuously from an inside end to an outside end of the pattern region 20-8 in the tire radial direction R.

In the pattern region 20-8 of the present exemplary embodiment, adjacent first asterisk projections 24 and second asterisk projections 26 are connected together by the connecting portions 52 and the connecting portions 54 that extend in different directions to each other, thereby enabling the direction of light reflected by the connecting portions to be varied. This thereby raises the uniformity of the appearance when viewed from different angles, enabling visibility to be enhanced. Similar advantageous effects to those of the fourth exemplary embodiment can also be obtained.

Ninth Exemplary Embodiment

Next, explanation follows regarding a ninth exemplary embodiment of the present invention. In the present exemplary embodiment, portions similar to those of the first to the eighth exemplary embodiments are allocated the same reference numerals, and detailed explanation thereof is omitted.

Figure 28:
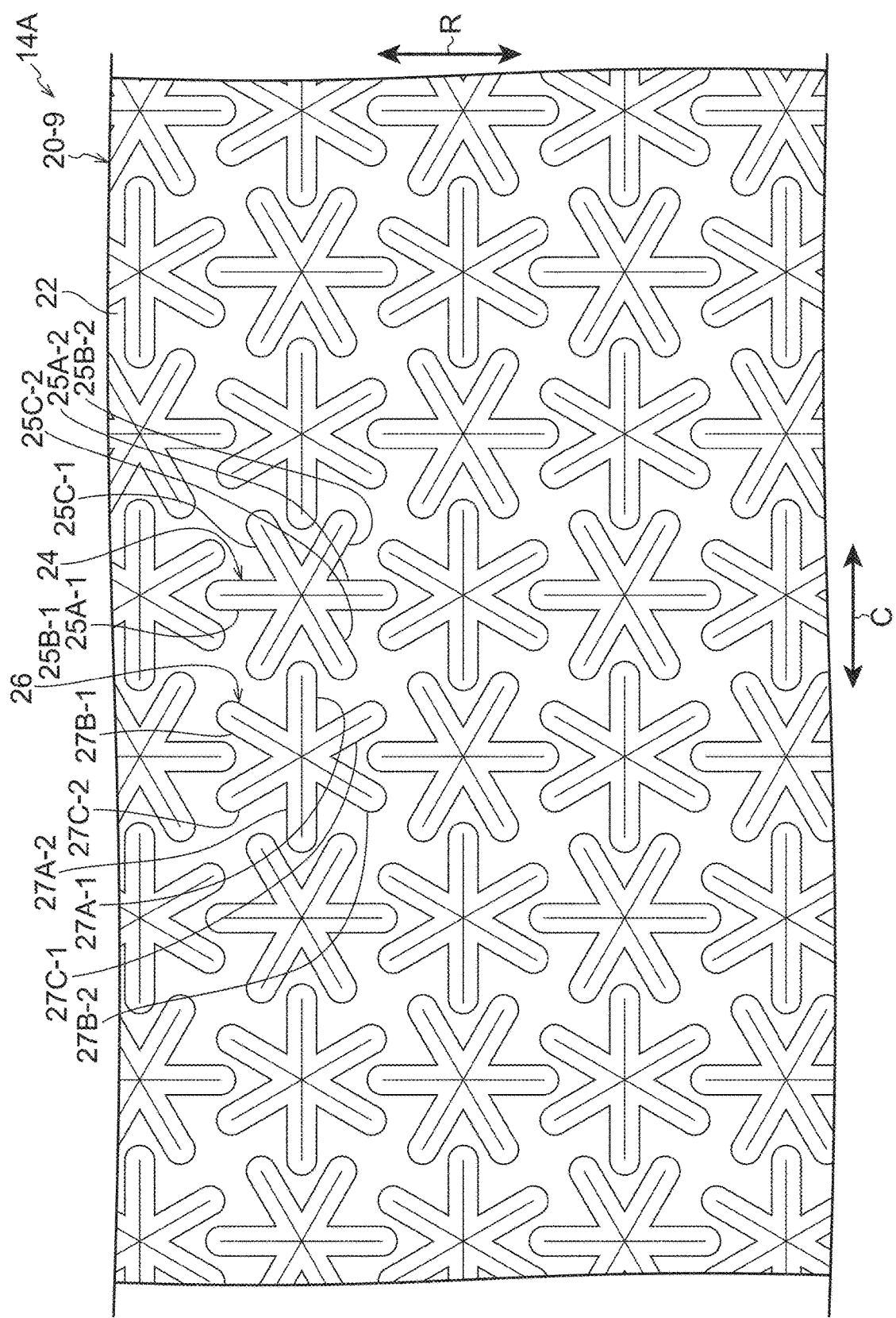
FIG. 28 illustrates a portion of a pattern region of a tire according to a ninth exemplary embodiment.
Figure 29:
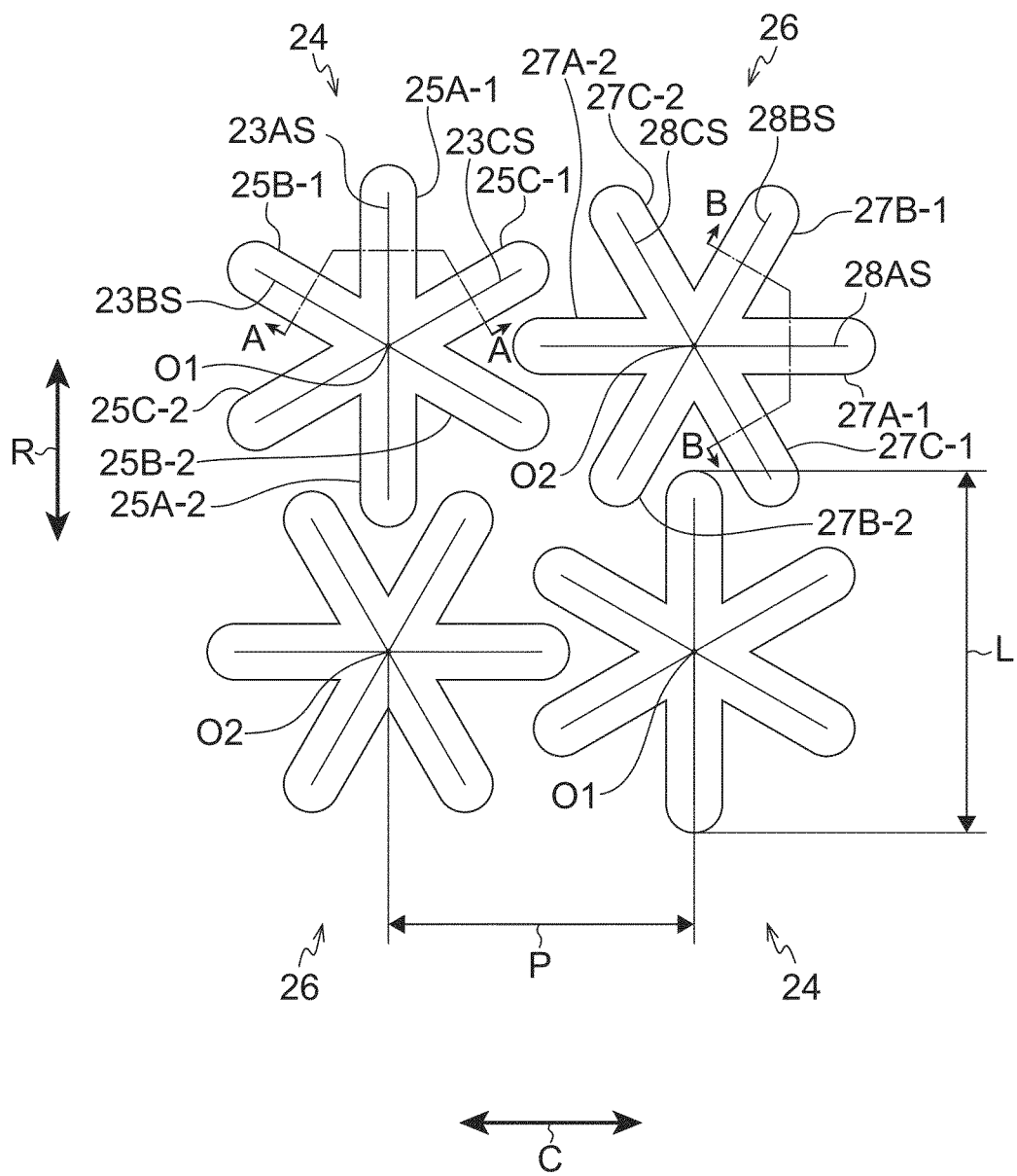
FIG. 29 is an enlarged diagram of a portion of a pattern region of a tire according to the ninth exemplary embodiment.

In a tire 10 of the present exemplary embodiment, the pattern region 20 of the first exemplary embodiment is modified to form a pattern region 20-9. As illustrated in FIG. 28 and FIG. 29, the pattern region 20-9 includes first asterisk projections 24 and second asterisk projections 26 similar in configuration and similar in placement to those of the first exemplary embodiment in plan view. In the present exemplary embodiment, the cross-sections of the first asterisk projection 24 and the second asterisk projection 26 differ to those of the first exemplary embodiment.

Figure 30A:
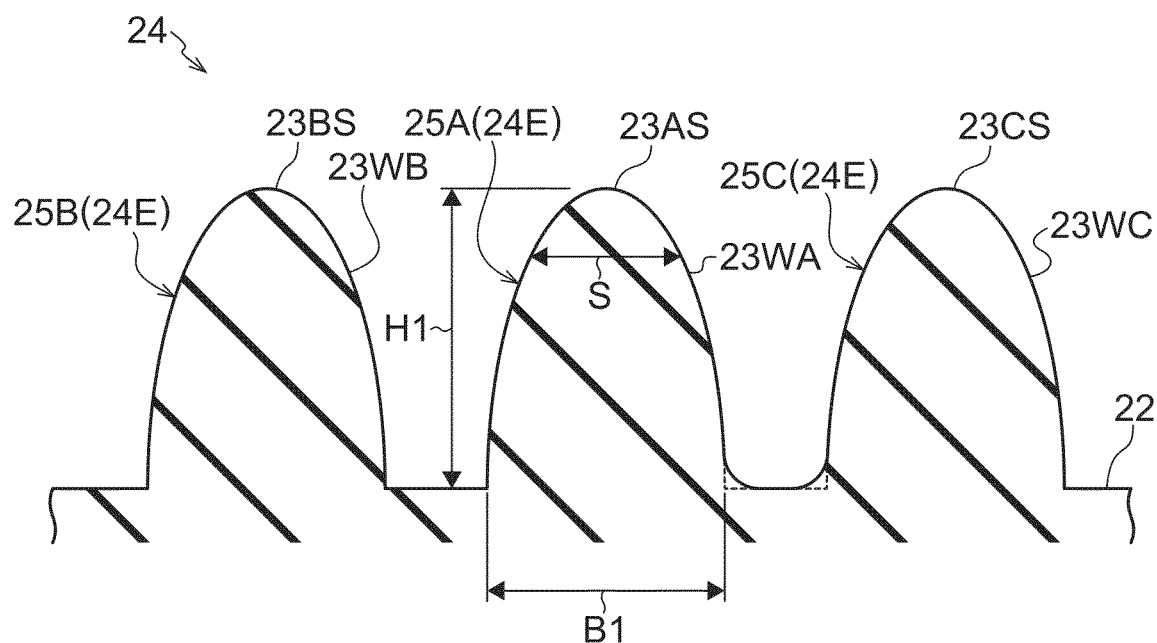
FIG. 30A is a cross-section taken along line A-A in FIG. 29.
Figure 30B:
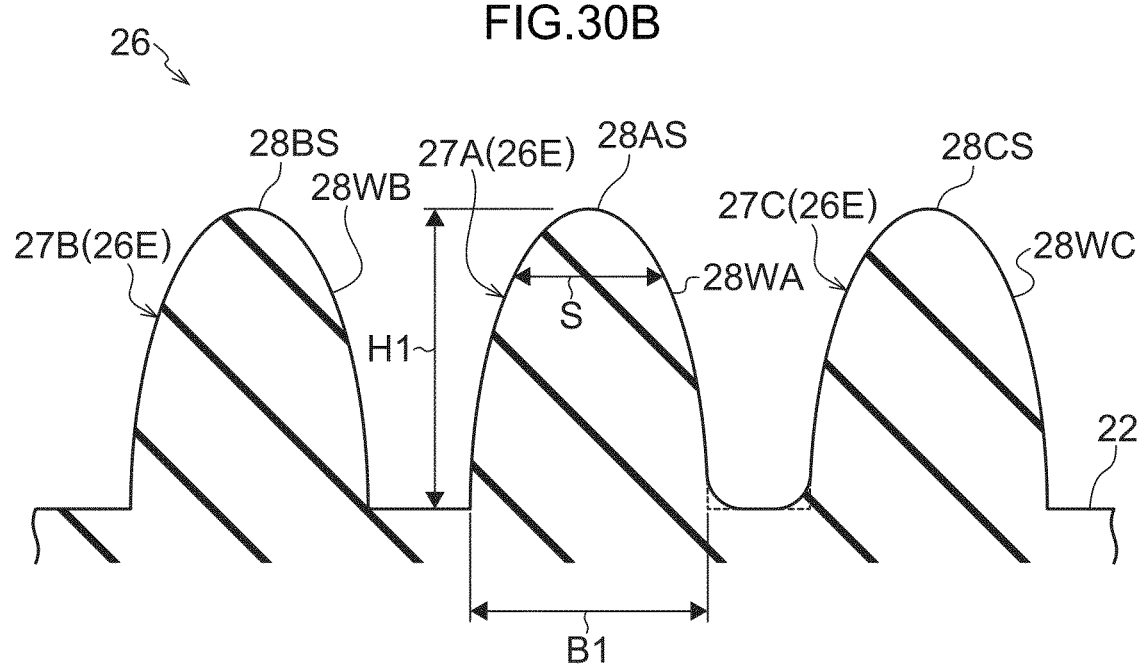
FIG. 30B is a cross-section taken along line B-B in FIG. 29.

As illustrated in FIG. 30A and FIG. 30B, in the first asterisk projection 24, each of the extension portions 24E is configured with a semi-elliptical cross-section as sectioned in a direction orthogonal to the extension direction of the extension portion 24E. A radius of curvature of each cross-section becomes greater on progression from the apex toward the base 22. In the following explanation, the apexes of the first extension portions 25A are referred to as first apexes 23AS, the apexes of the second extension portions 25B are referred to as second apexes 23BS, and the apexes of the third extension portion 25C are referred to as third apexes 23CS. The first apexes 23AS to the third apexes 23CS are curved so as to be convex at projection leading end sides of the first extension portion 25A to the third extension portion 25C (toward the upper side in the drawings). The height from the base 22 to the respective tips of the first apexes 23AS, the second apexes 23BS, and the third apexes 23CS (referred to below as the "projection height H1") is set from 0.1 mm to 1.0 mm. In the following explanation, the first apexes 23AS, the second apexes 23BS, and the third apexes 23CS are referred to collectively as the first apexes 23AS to the third apexes 23CS. Note that the projection height H1 is more preferably set in a range from 0.2 mm to 0.8 mm.

As illustrated in FIG. 30A, in the first asterisk projection 24, the base 22 has a flat profile between the first extension portions 25A and the second extension portions 25B, and the base 22 has a curved face profile between the first extension portions 25A and the third extension portion 25C. Moreover, as illustrated in FIG. 30B, in the second asterisk projection 26, described later, the base 22 has a flat profile between first extension portions 27A and second extension portions 27B, and the base 22 has a curved face profile between the first extension portions 27A and third extension portions 27C. Configuring the base 22 with a curved face profile suppresses reflection of incident light, thus increasing the contrast with the exterior of the pattern region 20-9, and enhancing visibility.

In the extension portions 24E, the projection height H1 is preferably 0.8 to 6 times a minor axis length B1 of the semi-elliptical profile (the distance between bases of the side wall faces at the base 22). If the projection height H1 is less than 0.8 times the minor axis length B1, light reflected at the first side wall face 23WA to the third side wall face 23WC returns to the outside from between the extension portions 24E, detracting from the enhancement in visibility. Namely, light is reflected, reducing the difference in contrast with the exterior of the pattern region 20-9, and thus detracting from the enhancement in visibility. On the other hand, if the projection height H1 is greater than 6 times the minor axis length B1, the first side wall face 23WA to the third side wall face 23WC form an angle that is almost perpendicular to the base 22, making the extension portions 24E liable to tilt over. Accordingly, in consideration of the effect of suppressing reflected light of the light incident between the extension portions 24E from returning to the outside from between the extension portions 24E, and also in consideration of the durability of the extension portions 24E, the projection height H1 is preferably from 0.8 times to 6 times the minor axis length B1.

The second asterisk projections 26 have the same shape as the first asterisk projections 24, and in plan view, the second asterisk projections 26 are arranged rotated 90° about the center O1 with respect to the orientation of the first asterisk projections 24. In each second asterisk projection 26, portions respectively corresponding to the first extension portions 25A-1, 25A-2, the second extension portions 25B-1, 25B-2, the third extension portions 25C-1, 25C-2, and the center O1 of the first asterisk projection 24 are referred to as first extension portions 27A-1, 27A-2, second extension portions 27B-1, 27B-2, third extension portions 27C-1, 27C-2, and the center O2. In the following explanation, the six extension portions above are referred to collectively as the "extension portions 26E". Moreover, portions corresponding to the first apexes 23AS, the second apexes 23BS, and the third apexes 23CS are referred to as first apexes 28AS, second apexes 28BS, and third apexes 28CS. In the following explanation, the first apexes 28AS, the second apexes 28BS, and the third apexes 28CS are referred to collectively as the first apexes 28AS to the third apexes 28CS. Moreover, portions corresponding to the first side wall faces 23WA, the second side wall faces 23WB, and the third side wall faces 23WC are referred to as first side wall faces 28WA, second side wall faces 28WB, and third side wall faces 28WC. In the following explanation, the first side wall faces 23WA, the second side wall faces 23WB, and the third side wall faces 23WC are referred to collectively as the first side wall faces 23WA to the third side wall faces 23WC, and the first side wall faces 28WA, the second side wall faces 28WB, and the third side wall faces 28WC are referred to collectively as the first side wall faces 28WA to the third side wall faces 28WC. Due to arranging the second asterisk projections 26 as described above, the respective extension portions 24E and the respective extension portions 26E extend in different directions to each other.

In the pattern region 20-9 of the present exemplary embodiment, the apexes (the first apexes 23AS to the third apexes 23CS, the first apexes 28AS to the third apexes 28CS) of the extension portions 24E of the first asterisk projection 24 and the extension portions 26E of the second asterisk projection 26 are curved so as to be convex at the projection leading end sides of the extension portions (toward the upper side in the drawing). Accordingly, the directions of reflected light can be dispersed to a greater extent than in cases in which the apexes have flat faces, such that the reflection directions in which light is reflected by the pattern region 20-9 are varied, thereby suppressing a concentration of reflected light. This thereby raises the uniformity of the appearance of the patterned section when viewed from different angles, enabling visibility to be enhanced.

Moreover, in the extension portions 24E and the extension portions 26E, when the first to third side wall faces 23WA to 23WC, 28WA to 28WC are viewed in cross-section taken orthogonally to their respective extension directions, the distance S between the side wall faces on either side increases on progression from the apex side toward the base 22. Accordingly, the spacing between the adjacent first apexes 23AS to the third apexes 23CS, and the first apexes 28AS to the third apexes 28CS, is wider than a spacing on the base 22 side, allowing light to be incident between the extension portions 24E and between the extension portions 26E over a wide range. The light that is incident between the extension portions 24E and between the extension portions 26E is reflected back and forth between the side wall faces, enabling reflected light to be suppressed from returning from between the extension portions to the outside.

Moreover, by configuring the cross-sections of the extension portions 24E and the extension portions 26E as sectioned in a direction orthogonal to their respective extension directions in the manner described above, removal from the mold is facilitated during manufacture, enabling molding characteristics to be enhanced. As a result, there is little inward tilting of the first asterisk projections 24 and the second asterisk projections 26, enabling durability to be enhanced.

Figure 31A:
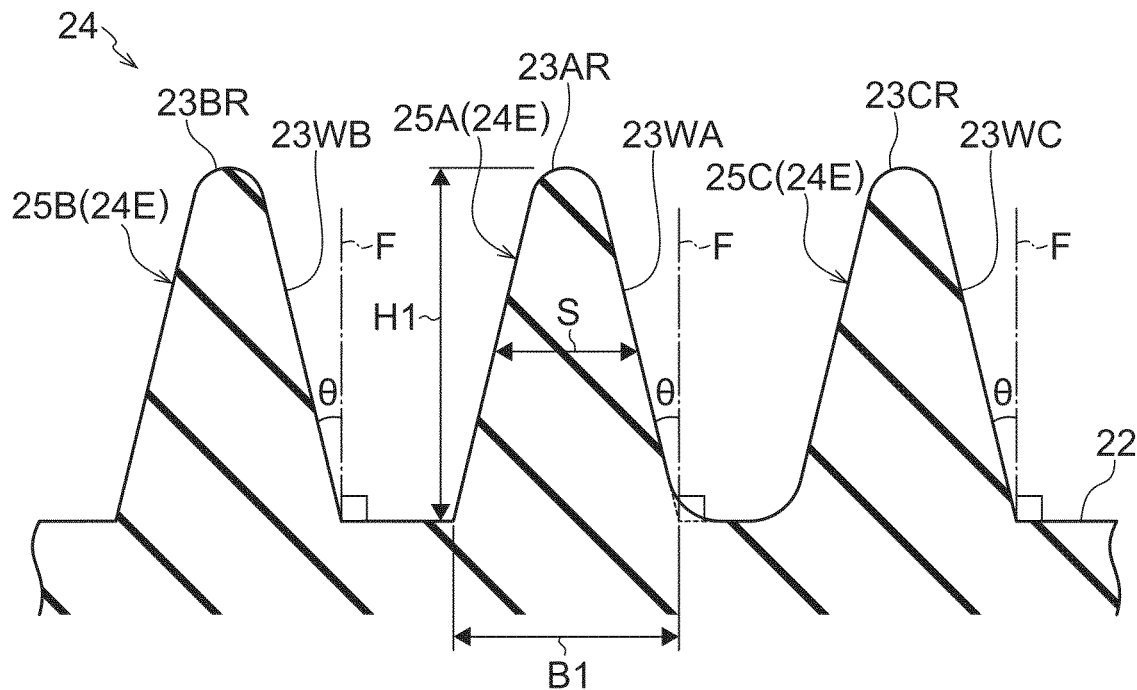
FIG. 31A is a cross-section of a portion corresponding to FIG. 30A in a tire according to a modified example of the ninth exemplary embodiment.
Figure 31B:
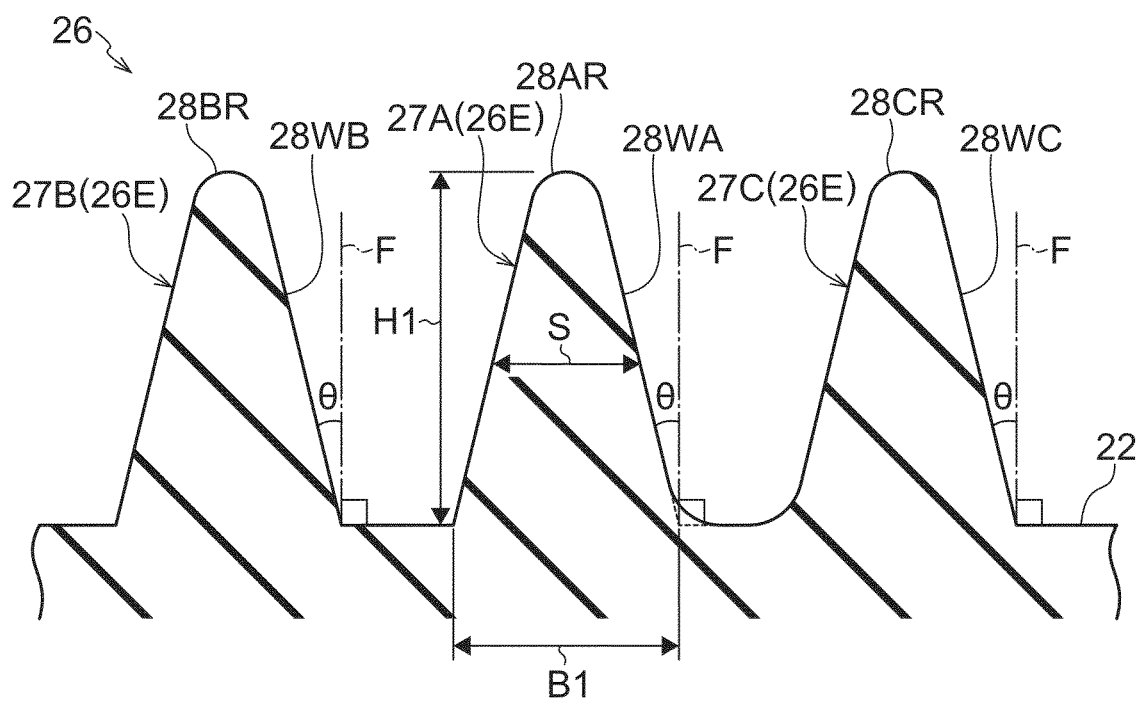
FIG. 31B is a cross-section of a portion corresponding to FIG. 30B in a tire according to a modified example of the ninth exemplary embodiment.

Note that in the present exemplary embodiment, the cross-sections of the extension portions 24E and the extension portions 26E as sectioned in a direction orthogonal to their respective extension directions are configured as semi-elliptical profiles. However, configuration may be made with other shapes. As illustrated in FIG. 31A and FIG. 31B, for example, the isosceles triangle shaped first apexes 23AS to the third apexes 23CS and the first apexes 28AS to the third apexes 28CS may have curved face profiles to configure first apexes 23AR to third apexes 23CR, and first apexes 28AR to third apexes 28AR.

The first side wall face 23WA, the second side wall face 23WB, and the third side wall face 23WC that configure inclined edges of the isosceles triangles of the extension portions 24E and the extension portions 26E illustrated in FIG. 31A and FIG. 31B each form an angle $\theta$ with respect to a hypothetical perpendicular plane F running perpendicular to the base 22. The angle $\theta$ is preferably set within a range from 5° to 30°, and the angle $\theta$ is more preferably set within a range from 15° to 25°. If the angle $\theta$ is an angle larger than 30°, light reflected by the first side wall face 23WA to the third side wall face 23WC returns to the outside from between the extension portions 24E and the extension portions 26E, detracting from the enhancement in visibility. Namely, light is reflected, reducing the difference in contrast with the exterior of the pattern region 20-9, and thus detracting from the enhancement in visibility. On the other hand, if the angle $\theta$ is smaller than 5°, the extension portions 24E and the extension portions 26E become liable to tilt over. Accordingly, in consideration of the effect of suppressing light incident between the extension portions 24E and the extension portions 26E from reflecting and returning to the outside from between the extension portions 24E and the extension portions 26E, and also in consideration of the durability of the extension portions 24E and the extension portions 26E, the angle $\theta$ is preferably set to from 5° to 30°.

Figure 32A:
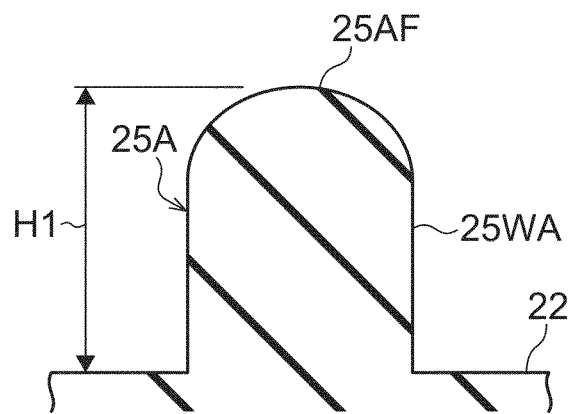
FIG. 32A is a cross-section of a first extension portion of a tire according to a modified example of the ninth exemplary embodiment.
Figure 32B:
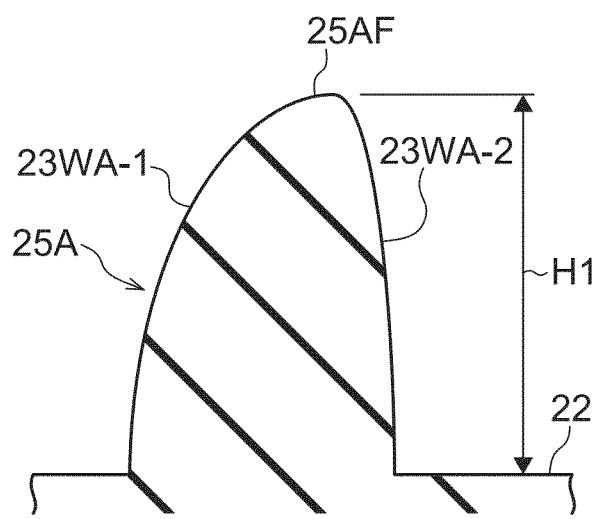
FIG. 32B is a cross-section of a first extension portion of a tire according to a modified example of the ninth exemplary embodiment.

Moreover, as illustrated in FIG. 32A, the extension portions 24E and the extension portions 26E may be configured with a profile formed by first side wall faces 25WA running perpendicular to the base 22, and a curved face 25AF at the apex. Providing the perpendicular first side wall faces 25WA makes the extension portions less liable to tilt over, enhancing durability. Moreover, as illustrated in FIG. 32B, out of opposing first side wall faces 23WA, the degree of flatness of one first side wall face 23WA-1 may be different to the degree of flatness of another first side wall face 23WA-2. Configuring the side wall face with different degrees of flatness suppresses concentration of reflected light. This thereby raises the uniformity of the appearance of the patterned section when viewed from different angles, enabling visibility to be enhanced. Note that FIG. 32A and FIG. 32B only illustrate the first extension portion 25A.

Moreover, the cross-sections of the first asterisk projection 24 and the second asterisk projection 26 of the present exemplary embodiment may be applied to a first asterisk projection 24 and a second asterisk projection 26 having similar configuration and similar placement to those of the second to the seventh exemplary embodiments.

Tenth Exemplary Embodiment

Next, explanation follows regarding a tenth exemplary embodiment of the present invention. In the present exemplary embodiment, portions similar to those of the first to the ninth exemplary embodiments are allocated the same reference numerals, and detailed explanation thereof is omitted.

A tire 10 of the present exemplary embodiment differs from those of the first to the ninth exemplary embodiments in the point that the pattern region 20 is formed to a tread 30. A pattern region 20 may be applied with the configuration of any one of the first to the ninth exemplary embodiment.

Figure 33:
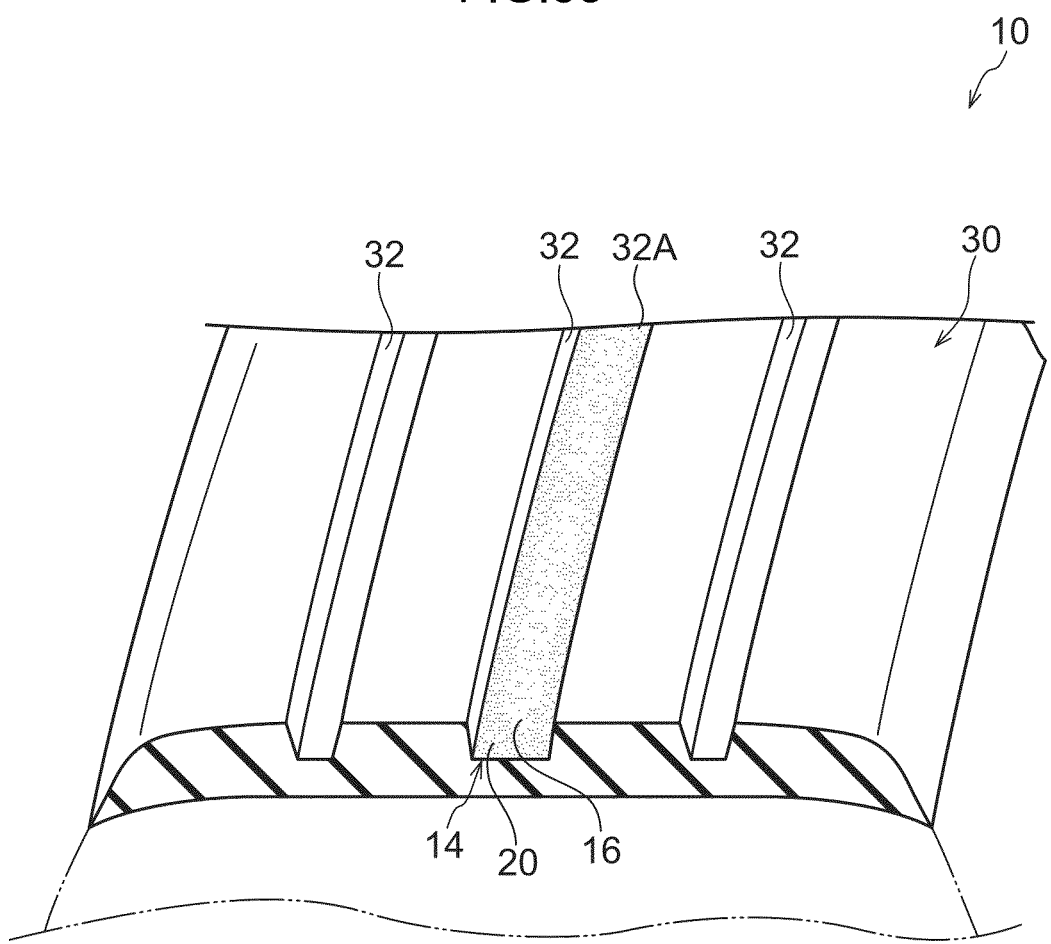
FIG. 33 is a perspective view and cross-section illustrating a portion of a tread of a tire according to a tenth exemplary embodiment.

As illustrated in FIG. 33, the tire 10 is provided with the tread 30 at a tire radial direction outside. The tread 30 is formed with plural circumferential direction grooves 32. A groove bottom 32A of one circumferential direction groove 32 is formed with a design 14 provided with the text region 16 and the pattern region 20. The pattern region 20 may be formed with a configuration similar to that of any of the first to the ninth exemplary embodiments.

The present exemplary embodiment enables the contrast between the text region 16 and the pattern region 20 of the design 14 formed to the groove bottom 32A of the tread 30 to be increased, enabling visibility to be enhanced in the tread 30.

Note that the tires 10 of the first to the tenth exemplary embodiments may be pneumatic tires, or may be non-pneumatic tires.

The invention claimed is:

1. A tire, comprising:
   a pattern region that is formed at an outer surface of the tire and that includes a base; and
   a plurality of unit patterns that are formed within the pattern region, each of the unit patterns including a bend point and extension portions having a projection height from the base of from 0.1 mm to 1.0 mm, the extension portions extending in a plurality of directions from the bend point, in plan view,
   wherein a spacing between bend points of adjacent unit patterns among the plurality of unit patterns is from 0.2 mm to 1.0 mm, and
   wherein, for the adjacent unit patterns, in plan view, at least one of the extension portions of one of the unit patterns extends in a different direction than all of the extension portions of another of the unit patterns.

2. The tire of claim 1, wherein, in plan view, a maximum length of each of the unit patterns is larger than the spacing between the bend points of the adjacent unit patterns.

3. The tire of claim 1, wherein three or more of the extension portions are present in each unit pattern of the plurality of unit patterns, and respective angles formed between the adjacent extension portions are the same.

4. The tire of claim 1, wherein two adjacent unit patterns, among the plurality of unit patterns, are connected together by a connecting portion.

5. The tire of claim 4, wherein all of the unit patterns within the pattern region are in communication with an end portion of the pattern region.

6. The tire of claim 4, wherein the connecting portion connects together the plurality of unit patterns such that the plurality of the unit patterns are continuous with each other from one end to another end of the pattern region.

7. The tire of claim 6, wherein a continuous zigzag is formed by the extension portions of the connected unit patterns.

8. The tire of claim 1, wherein the extension portions each include an apex that is convexly curved at a projection leading end side of the extension portions.

9. The tire of claim 1, wherein at least one of the extension portions of the unit patterns has a curved shape.

10. The tire of claim 9, wherein the at least one of the extension portions having a curved shape curves such that a leading end of the at least one of the extension portions approaches one of the extension portions of another of the unit patterns.

11. The tire of claim 1, wherein the pattern region is formed at a tire side portion.

12. The tire of claim 1, wherein the pattern region is formed in a groove of a tread.

* * * * *